(12) United States Patent
Ryan

(10) Patent No.: US 8,429,095 B1
(45) Date of Patent: Apr. 23, 2013

(54) FLUID DELIVERY CONTROL NOZZLE

(76) Inventor: Michael C. Ryan, Mitchellville, IA (US)

( * ) Notice: Subject to any disclaimer, the term of this patent is extended or adjusted under 35 U.S.C. 154(b) by 0 days.

(21) Appl. No.: 09/566,972

(22) Filed: May 9, 2000

Related U.S. Application Data

(63) Continuation of application No. 08/872,349, filed on Jun. 10, 1997, now Pat. No. 5,913,180, which is a continuation of application No. 08/402,199, filed on Mar. 10, 1995, now abandoned.

(51) Int. Cl.
| | | |
|---|---|---|
| G06F 17/00 | (2006.01) | |
| G05D 7/00 | (2006.01) | |
| B65B 1/30 | (2006.01) | |
| G05B 19/00 | (2006.01) | |

(52) U.S. Cl.
USPC ............ 705/413; 700/282; 700/244; 141/94; 141/231; 340/5.9

(58) Field of Classification Search .............. 222/1, 52, 222/23; 235/380, 381; 340/5.1, 5.5; 700/231, 700/236, 237, 241, 283; 705/413; 141/392
See application file for complete search history.

(56) References Cited

U.S. PATENT DOCUMENTS

| | | |
|---|---|---|
| 3,054,904 A | 9/1962 | Fuciarelli |
| 3,492,494 A | 1/1970 | Clark et al. |
| 3,642,036 A | 2/1972 | Ginsburgh et al. ............ 141/94 |
| 3,650,303 A | 3/1972 | Chambers et al. ............ 141/1 |
| 3,713,148 A | 1/1973 | Cardullo et al. |
| 3,742,150 A | 6/1973 | Sherman et al. ............ 179/82 |
| 3,786,421 A | 1/1974 | Wostl et al. ............ 340/149 A |
| 3,814,148 A | 6/1974 | Wostl ............ 141/98 |
| 3,844,264 A | 10/1974 | Grainger |
| 4,067,061 A | 1/1978 | Juhasz ............ 364/900 |
| 4,080,537 A | 3/1978 | Bucher |

(Continued)

FOREIGN PATENT DOCUMENTS

| | | |
|---|---|---|
| AU | 21897 A1 | 3/1989 |
| AU | 602791 B2 | 9/1989 |

(Continued)

OTHER PUBLICATIONS

Leyrer: "Unusual Way to Build a Service Center"; American City, Feb. 1973, vol. 88, No. 2, pp. 71-74, (Abstract Only).*

(Continued)

*Primary Examiner* — Igor Borissov
(74) *Attorney, Agent, or Firm* — Berry & Associates P.C.

(57) ABSTRACT

A fluid delivery nozzle for wireless communication to either an active or a passive device located on a vehicle and for wireless communication from the fluid delivery nozzle to a central location for storage of vehicle data. Upon initiation of a fluid delivery transaction, a communication link is established between a vehicle communication device and the central location and between a fluid container of the vehicle and the fluid delivery nozzle. The information received from the vehicle and container is relayed to the central location to authorize delivery of a fluid to the vehicle. Information is also transferred from the central location back and forth to the fluid delivery nozzle to update and store information regarding the fluid delivery transaction. A keyboard and display are provided on the fluid delivery nozzle to provide an operator interface during the fluid delivery transaction. Using the keyboard, the operator may directly control the delivery of fluid to the container or may respond to information displayed on the nozzle during the fluid delivery transaction.

30 Claims, 22 Drawing Sheets

U.S. PATENT DOCUMENTS

| | | | |
|---|---|---|---|
| 4,106,006 A | 8/1978 | Atkins | |
| 4,109,686 A | 8/1978 | Phillips | 141/1 |
| 4,148,372 A | 4/1979 | Schroeder | |
| 4,175,635 A | 11/1979 | Thomas | |
| 4,186,381 A * | 1/1980 | Fleischer et al. | 222/651 |
| 4,189,712 A | 2/1980 | Lemelson | |
| 4,200,227 A | 4/1980 | Lemelson | |
| 4,227,588 A | 10/1980 | Biancardi | |
| 4,236,594 A | 12/1980 | Ramsperger | |
| 4,250,550 A | 2/1981 | Fleischer | 364/465 |
| 4,258,421 A * | 3/1981 | Juhasz et al. | 701/33.2 |
| 4,260,983 A | 4/1981 | Falck et al. | |
| 4,263,945 A | 4/1981 | Van Ness | |
| RE30,686 E | 7/1981 | Bucher | |
| 4,288,778 A | 9/1981 | Zucker | |
| 4,344,136 A | 8/1982 | Panik | 364/424 |
| 4,345,146 A | 8/1982 | Story et al. | 235/381 |
| 4,354,189 A | 10/1982 | Lemelson | |
| 4,361,202 A * | 11/1982 | Minovitch | 180/168 |
| 4,383,242 A | 5/1983 | Sassover et al. | |
| 4,384,288 A | 5/1983 | Walton | |
| 4,438,426 A | 3/1984 | Adkins | |
| 4,453,161 A | 6/1984 | Lemelson | |
| 4,469,149 A | 9/1984 | Walkey et al. | |
| 4,473,825 A | 9/1984 | Walton | |
| 4,477,874 A | 10/1984 | Ikuta et al. | |
| 4,482,964 A | 11/1984 | Berstein et al. | 364/465 |
| 4,488,153 A | 12/1984 | Lange | 343/6.5 SS |
| 4,490,798 A | 12/1984 | Franks et al. | |
| 4,499,464 A | 2/1985 | Knox et al. | |
| 4,510,495 A | 4/1985 | Sigrimis et al. | |
| 4,532,511 A | 7/1985 | Lemelson | 340/933 |
| 4,553,511 A | 11/1985 | Hayakawa et al. | |
| 4,563,739 A | 1/1986 | Gerpheide et al. | 364/403 |
| 4,600,829 A | 7/1986 | Walton | 235/439 |
| 4,627,553 A | 12/1986 | Yoshida et al. | 22/14 |
| 4,630,292 A | 12/1986 | Juricich et al. | 377/20 |
| 4,650,981 A | 3/1987 | Foletta | |
| 4,691,801 A | 9/1987 | Mann et al. | |
| 4,692,604 A | 9/1987 | Billings | |
| 4,697,171 A | 9/1987 | Suh | |
| 4,714,925 A * | 12/1987 | Bartlett | 340/10.33 |
| 4,738,334 A | 4/1988 | Weishaupt | |
| 4,749,873 A | 6/1988 | Mutoh et al. | |
| 4,752,899 A | 6/1988 | Newman et al. | 364/550 |
| 4,754,255 A | 6/1988 | Sanders et al. | |
| 4,763,121 A | 8/1988 | Tomoda et al. | |
| 4,779,090 A | 10/1988 | Micznik et al. | |
| 4,795,898 A | 1/1989 | Bernstein et al. | |
| 4,798,322 A | 1/1989 | Bernstein et al. | |
| 4,804,937 A | 2/1989 | Barbiaux et al. | 340/52 F |
| 4,805,722 A | 2/1989 | Keating et al. | |
| 4,808,803 A | 2/1989 | Magier et al. | |
| 4,809,199 A | 2/1989 | Burgess et al. | |
| 4,822,990 A | 4/1989 | Tamada et al. | |
| 4,829,166 A | 5/1989 | Froelich | |
| 4,835,407 A | 5/1989 | Kataoka et al. | |
| 4,837,556 A | 6/1989 | Matsushita et al. | 340/310 R |
| 4,837,567 A | 6/1989 | Kleefeldt et al. | |
| 4,839,854 A | 6/1989 | Sakami et al. | 364/900 |
| 4,846,233 A | 7/1989 | Fockens | |
| 4,852,680 A | 8/1989 | Brown et al. | |
| 4,853,859 A | 8/1989 | Morita et al. | 364/424.02 |
| 4,866,616 A | 9/1989 | Takeuchi et al. | |
| 4,868,409 A | 9/1989 | Tanaka et al. | |
| 4,870,419 A | 9/1989 | Baldwin et al. | |
| 4,884,207 A | 11/1989 | Asada et al. | |
| 4,887,064 A | 12/1989 | Drori et al. | |
| 4,897,642 A | 1/1990 | DiLullo et al. | 340/825.06 |
| 4,914,314 A | 4/1990 | Hirtz | |
| 4,918,955 A | 4/1990 | Kimura et al. | |
| 4,926,331 A | 5/1990 | Windle et al. | |
| 4,928,778 A | 5/1990 | Tin | |
| 4,929,818 A | 5/1990 | Bradbury et al. | 235/381 |
| 4,931,664 A | 6/1990 | Knoll | |
| 4,932,494 A | 6/1990 | Chandler | |
| 4,934,419 A | 6/1990 | Lamont et al. | |
| 4,937,581 A | 6/1990 | Baldwin et al. | |
| 4,942,393 A | 7/1990 | Waraksa et al. | |
| 4,965,460 A | 10/1990 | Tanaka et al. | |
| 4,967,366 A * | 10/1990 | Kaehler | 700/237 |
| 4,973,958 A | 11/1990 | Hirano et al. | |
| 4,980,680 A | 12/1990 | Knoll et al. | |
| 4,982,072 A | 1/1991 | Takigami | |
| 4,987,402 A | 1/1991 | Nykerk | |
| 4,990,906 A | 2/1991 | Kell et al. | |
| 4,991,683 A | 2/1991 | Garretto et al. | |
| 5,003,801 A | 4/1991 | Stinar et al. | |
| 5,019,812 A | 5/1991 | Gostahagberg et al. | |
| 5,024,186 A | 6/1991 | Long et al. | |
| 5,025,253 A | 6/1991 | DiLullo et al. | 340/825.06 |
| 5,049,729 A | 9/1991 | Dease | |
| 5,049,867 A | 9/1991 | Stouffer | |
| 5,054,569 A | 10/1991 | Scott et al. | |
| 5,058,044 A * | 10/1991 | Stewart et al. | 702/184 |
| 5,070,328 A | 12/1991 | Fockens | 340/825.54 |
| 5,070,535 A | 12/1991 | Hochmair et al. | 455/41 |
| 5,072,380 A * | 12/1991 | Randelman et al. | 705/13 |
| 5,081,667 A | 1/1992 | Drori et al. | |
| 5,086,389 A | 2/1992 | Hassett et al. | 364/401 |
| 5,088,621 A | 2/1992 | Thompson et al. | 222/1 |
| 5,091,856 A | 2/1992 | Hasegawa et al. | |
| 5,134,716 A * | 7/1992 | Craig | 455/66.1 |
| 5,156,198 A * | 10/1992 | Hall | 141/94 |
| 5,184,309 A | 2/1993 | Simpson | |
| 5,185,739 A * | 2/1993 | Spear | 370/337 |
| 5,204,819 A | 4/1993 | Ryan | 364/465 |
| 5,359,522 A | 10/1994 | Ryan | 364/465 |
| 5,422,624 A * | 6/1995 | Smith | 340/438 |
| 5,442,553 A * | 8/1995 | Parrillo | 455/420 |
| 5,604,676 A * | 2/1997 | Penzias | 705/417 |
| 5,608,632 A * | 3/1997 | White | 701/103 |
| 5,642,484 A * | 6/1997 | Harrison et al. | 705/14 |
| 5,717,374 A * | 2/1998 | Smith | 340/438 |
| 5,727,608 A | 3/1998 | Nusbaumer et al. | 141/94 |
| 5,732,346 A * | 3/1998 | Lazaridis et al. | 455/406 |
| 5,742,229 A * | 4/1998 | Smith | 340/438 |
| 5,774,790 A | 6/1998 | Dupuy | 370/337 |
| 5,806,018 A * | 9/1998 | Smith et al. | 701/211 |
| 5,868,179 A * | 2/1999 | Hartsell, Jr. | 141/198 |
| 5,913,180 A | 6/1999 | Ryan | 702/45 |
| 5,971,042 A * | 10/1999 | Hartsell, Jr. | 141/198 |
| 6,024,142 A * | 2/2000 | Bates | 141/94 |
| 6,073,840 A | 6/2000 | Marion | |
| 6,078,850 A * | 6/2000 | Kane et al. | 701/29 |
| 6,085,805 A * | 7/2000 | Bates | 141/94 |
| 6,116,298 A * | 9/2000 | Haimovich et al. | 141/94 |
| 6,169,938 B1 * | 1/2001 | Hartsell, Jr. | 700/302 |
| 6,193,154 B1 * | 2/2001 | Phillips et al. | 235/381 |
| 6,542,076 B1 | 4/2003 | Joao | |
| 6,571,151 B1 | 5/2003 | Leatherman | |

FOREIGN PATENT DOCUMENTS

| | | | |
|---|---|---|---|
| DE | 3132016 A1 | 3/1983 | |
| DE | 3308803 A1 | 9/1984 | |
| DE | 3438939 | * 5/1986 | |
| EP | 0105774 A1 | 4/1984 | |
| EP | 0153613 A2 | 4/1985 | |
| EP | 0158354 A2 | 10/1985 | |
| EP | 0789439 A2 | 4/1986 | |
| EP | 0204542 A2 | 10/1986 | |
| EP | 0204542 B1 | 10/1986 | |
| EP | 0204384 A1 | 12/1986 | |
| EP | 0204542 | 12/1986 | |
| EP | 0040544 | 1/1987 | |
| EP | 0287402 A2 | 10/1988 | |
| EP | 0179160 A1 | 4/1989 | |
| EP | 0314143 A2 | 5/1989 | |
| EP | 0337751 A2 | 10/1989 | |
| EP | 0349316 | 1/1990 | |
| EP | 0350325 A2 | 1/1990 | |
| EP | 0354102 A1 | 2/1990 | |
| EP | 0358525 A2 | 3/1990 | |
| EP | 0372741 A2 | 6/1990 | |
| EP | 0373337 A1 | 6/1990 | |
| EP | 0393660 A1 | 10/1990 | |
| EP | 0736484 A2 * | 10/1996 | |

| | | | |
|---|---|---|---|
| EP | 0974940 A2 * | 1/2000 | |
| FR | 2518285 | 6/1983 | |
| FR | 2568835 A1 | 2/1986 | |
| FR | 2600318 | 12/1987 | |
| FR | 2600604 A1 | 12/1987 | |
| GB | 2051442 A | 1/1981 | |
| GB | 2079837 A | 1/1982 | |
| GB | 2087969 A | 6/1982 | |
| GB | 2113756 A | 8/1983 | |
| GB | 2147273 A | 5/1985 | |
| GB | 2187794 A | 9/1987 | |
| GB | 2197101 A | 5/1988 | |
| GB | 2 174 383 A | 11/1988 | |
| GB | 2204542 A | 11/1988 | |
| JP | 5732144 | 2/1982 | |
| JP | 62203854 A | 8/1987 | |
| JP | 62297971 A | 12/1987 | |
| WO | 8400869 | 3/1984 | |
| WO | WO88/05391 A1 | 7/1988 | |
| WO | WO88/06110 A1 | 8/1988 | |
| WO | WO89/02508 A1 | 3/1989 | |
| WO | WO89/07814 A1 | 8/1989 | |
| WO | WO89/07815 A1 | 8/1989 | |
| ZA | 1988-08469 | 7/1990 | |

OTHER PUBLICATIONS

Abrahms: "Vienna Firm Signs Deal With Visa for Radio Credit Check"; Wasington Business Journal (McLean, VA, US) Feb. 25, 1991, vol. 9, No. 39, section 1, p. 15.*
1986 Clifford System III with Remote Control.
1986 Toyota Supra Electric Wiring Diagram.
1986 Toyota Supra New Car Features.
1986 Toyota Supra Owner's Manual (divided into 2 files) (part 1 of 2).
1986 Toyota Supra Owner's Manual (part 2 of 2).
1987 Toyota Camry New Car Features.
1988 Toyota Celica All-Trac/4WD and Toyota Camry All-Trac/4WD New Car Features.
1989 Cadillac Seville Owner's Manual, published 1988.
1990 Cadillac Seville Owner's Literature, published 1989, cover, intro, pp. 66-71 & 129-131.
1990 Cadillac Seville Owner's Manual, published 1989 (divided into 2 files) (part 1 of 2).
1990 Cadillac Seville Owner's Manual, published 1989 (part 2 of 2).
Ames, R., Perspectives in Radio Frequency Identification, 1990.
Auto Alarm Systems, Consumer Reports, Oct. 1986, p. 658-662.
Defendants' Common Preliminary Invalidity Contentions, in the United States District Court for Southern District of Texas Houston Division, *Rydex, Ltd.*, v *Ford Motor Company, et al.*, Civil Action No. 4:11-cv-00122, Mar. 9, 2012.
Denial of Petition for Exemption from the Vehicle Theft Prevention Standard, 54 Fed. Reg. 13969, Apr. 6, 1989.
Fleet Management System from Mannesmann Kienzle, ATZ Automobiltechnische Zeitschrift 89, Sep. 1987, 9 (with English translation).
Gohring, Ernst, Current and Future Applications of Electronics in Commercial Vehicles—Part 2, ATZ Automobiltechnische Zeitschrift 91, Mar. 1989, 3 (with English translation).
Grant of Petition for Exemption from the Vehicle Theft Prevention Standard, 51 Fed. Reg. 21823, Jun. 16, 1986.
Mercedes Transport Consultancy, Verkehr 39, Sep. 29, 1990 (with English translation).
Minsterman, A. et al., Vehicle Security Trends in the United States, SAE Technical Paper Series, 901166, 1990.
P.S.I Guardian, Effective bolting device system for heavy trucks and buses protects against theft, Verkehrs Rundschau, Mar./Apr. 1990 (with English translation).
Schroeder, T. et al., the Vehicle Anit-Theft System—VATS, SAE Technical Paper Series, 861359, 1986.
Schwind, G., RFID: Electronic Codes for Automatic Identification, Material Handling Engineering, Sep. 1987.
US 4,926,494, 05/1990, Potter (withdrawn)

* cited by examiner

FLUID DELIVERY CONTROL NOZZLE

This application is a continuation application of Ser. No. 08/872,349 which was originally filed on Jun. 10, 1997 and issued as U.S. Pat. No. 5,913,180 on Jun. 15, 1999, which was a continuation application of Ser. No. 08/402,199, filed Mar. 10, 1995, now abandoned.

BACKGROUND OF THE INVENTION

The present invention relates generally to a nozzle for controlling the delivery of fluid to a container or reservoir and, more specifically, to a nozzle for the exchange of security, identification, and transaction information between a container, such as a fuel or other fluid storage tank, and a fluid delivery system.

The delivery and control of the delivery of fluids is ubiquitous, varying from water, such as for irrigation, liquefied petroleum gas (propane), oxygen and other gases, and petroleum based fuels such as gasoline and diesel fuel. As a specific example, many vehicles are operated as a part of a commercial enterprise wherein detailed and accurate records are needed to account properly for the use of the vehicle and to support income tax return filings. Very often the vehicle is owned other than by the operator and fuel used by the vehicle is purchased by the absentee owner at the time a fuel delivery is made. Accurate and reliable records are necessary to assure that the appropriate vehicle receives the purchased fuel and, to the extent possible, that the miles logged by the vehicle correspond to actual commercial, not private, use.

To address these requirements of fluid delivery and control, devices such as those described in U.S. Pat. No. 5,204,819 and United States Letters Patent No. 5,359,522 provide means for radio frequency communication between a fluid delivery device and a fluid container. To increase the efficiency and desirability of these aforementioned devices, it would be beneficial to provide means for communicating information received during a fluid delivery directly from the fluid delivery nozzle via a wireless communicative link. It would be additionally desirable to allow an operator to input information directly into the nozzle during a fueling operation and to have information displayed on the nozzle for viewing by the operator. The following specification and claims address these supplemental advantages.

SUMMARY OF THE INVENTION

The present invention includes a fluid delivery nozzle for delivering fluid from a fluid delivery device to a fluid container and for communicating information regarding a fluid delivery transaction to a remote device. A nozzle capable of controlling flow of fluid from a fluid delivery device to a fluid container is provided. Provided on the nozzle are input means for allowing information regarding the fluid delivery transaction to be inputted into the nozzle. Coupled to the input means are transmitting means for transmitting the information regarding the fluid delivery transaction. Also provided on the nozzle are display means for allowing information regarding the fluid delivery transaction to be displayed on the nozzle. Receiving means are coupled to the display means for receiving information regarding the fluid delivery transaction.

In a preferred embodiment, a fluid container with an associated information storage and retrieval device is provided. A first information storage and retrieval device is secured to the nozzle. Associated with a remote location is a second information storage and retrieval device. Means are associated with the second information storage and retrieval device for transmitting information relative to a fluid delivery transaction from the second information storage and retrieval device to the first information storage and retrieval device.

Means are associated with the first information storage and retrieval device for wireless communication with the second information storage and retrieval device. The input means are an operator input keyboard associated with the first information storage and retrieval device which allows an operator to input information directly from the nozzle during the fluid delivery transaction. The display means are a liquid crystal display associated with the first information storage and retrieval device to give the operator information regarding the fluid delivery transaction, previous fluid deliveries, and diagnostics relating to the vehicle to which the fluid container is attached.

An object of the present invention is to provide a fluid delivery control system which eliminates hardwire connection between a fluid delivery nozzle and a fluid delivery device.

Another object of the present invention is to provide a fluid delivery control apparatus which may be quickly and inexpensively installed on an existing fluid nozzle.

A further object of the present invention is to allow existing fluid nozzles to interface with existing information transmission devices provided on various vehicles.

Still another object of the present invention is to provide operator control of a fluid delivery transaction directly from a fluid nozzle.

Another object of the present invention is to provide feedback to an operator from a fluid nozzle during a fluid delivery transaction.

Yet another object of the present invention is to provide means on a fluid nozzle for communicating with either a passive or active transponder regarding information concerning a fluid delivery transaction.

Yet another object of the present invention is to provide means for inductively charging a fluid nozzle when the fluid nozzle is docked into a docking station.

DETAILED DESCRIPTION OF A PREFERRED EMBODIMENT

Figure 1:
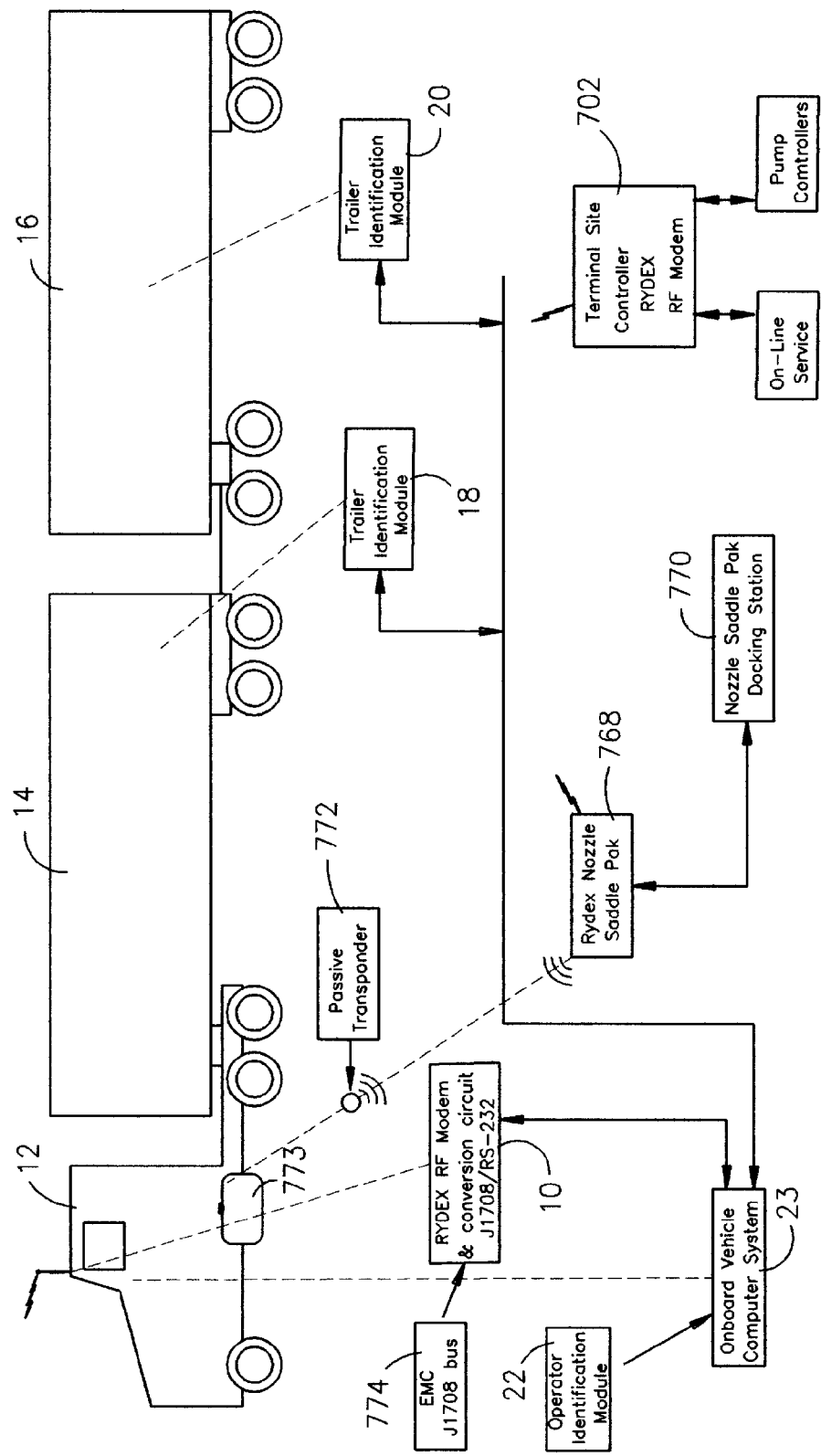
FIG. 1 is a diagrammatical view of a vehicle and two trailers on which transponders have been installed and including a schematic block diagram of the exchange of information between a saddle pack, a terminal site controller, and the vehicle.
Figure 2:
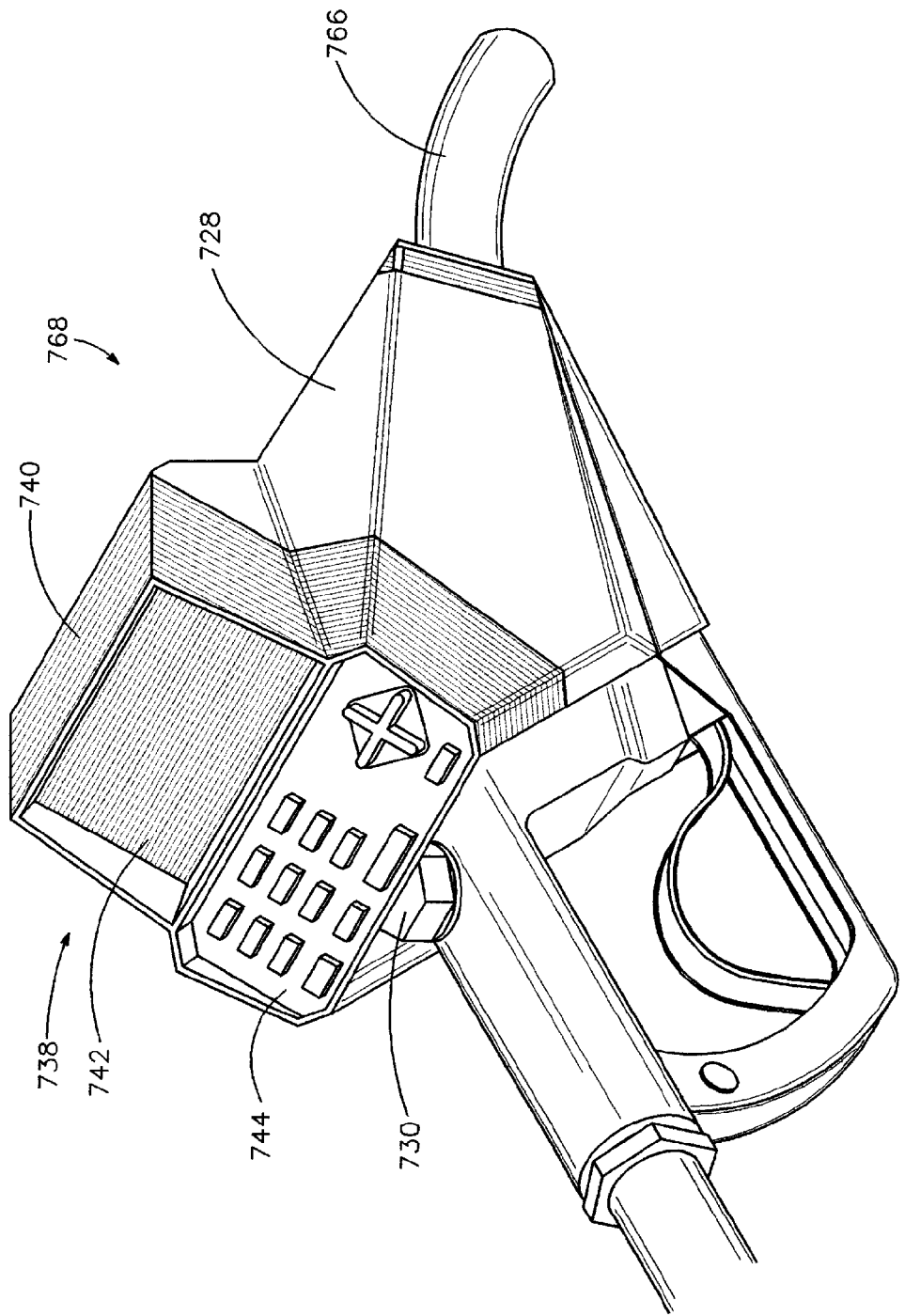
FIG. 2 is a perspective view of the saddle pack of the present invention.
Figure 3:
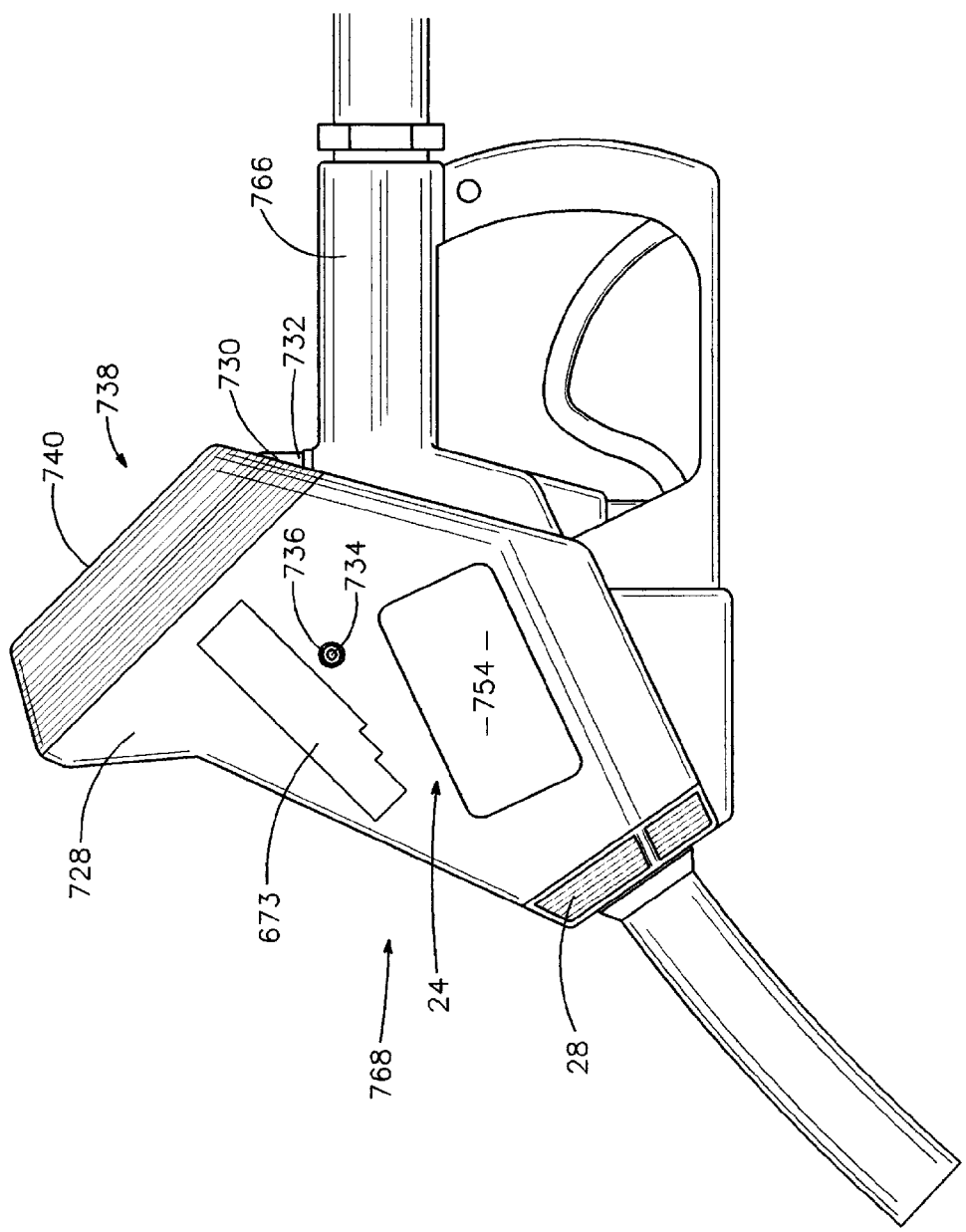
FIG. 3 is a side elevation in partial phantom showing the saddle pack of FIG. 1 secured to a fluid delivery nozzle.

FIG. 2 shows a perspective view of a nozzle saddle pack 768 of the present invention secured to a standard fuel nozzle 766. A truck tractor 12 (FIG. 1) is provided with a vehicle identification module 10 and a passive transponder 772 secured near a fuel tank orifice 773 of the truck tractor 12. The saddle pack 768 of the present invention is provided with a fuel nozzle module 24 which is coupled to a fuel nozzle coil 28 (FIG. 3). The fuel nozzle coil 28 communicates via radio frequency communication with the passive transponder 772 upon insertion of the nozzle 766 into the fuel tank orifice 773 of the truck tractor 12. The passive transponder 772 transmits a unique identification code to the fuel nozzle module 24 located within the saddle pack 768 (FIGS. 1-3).

Figure 6:
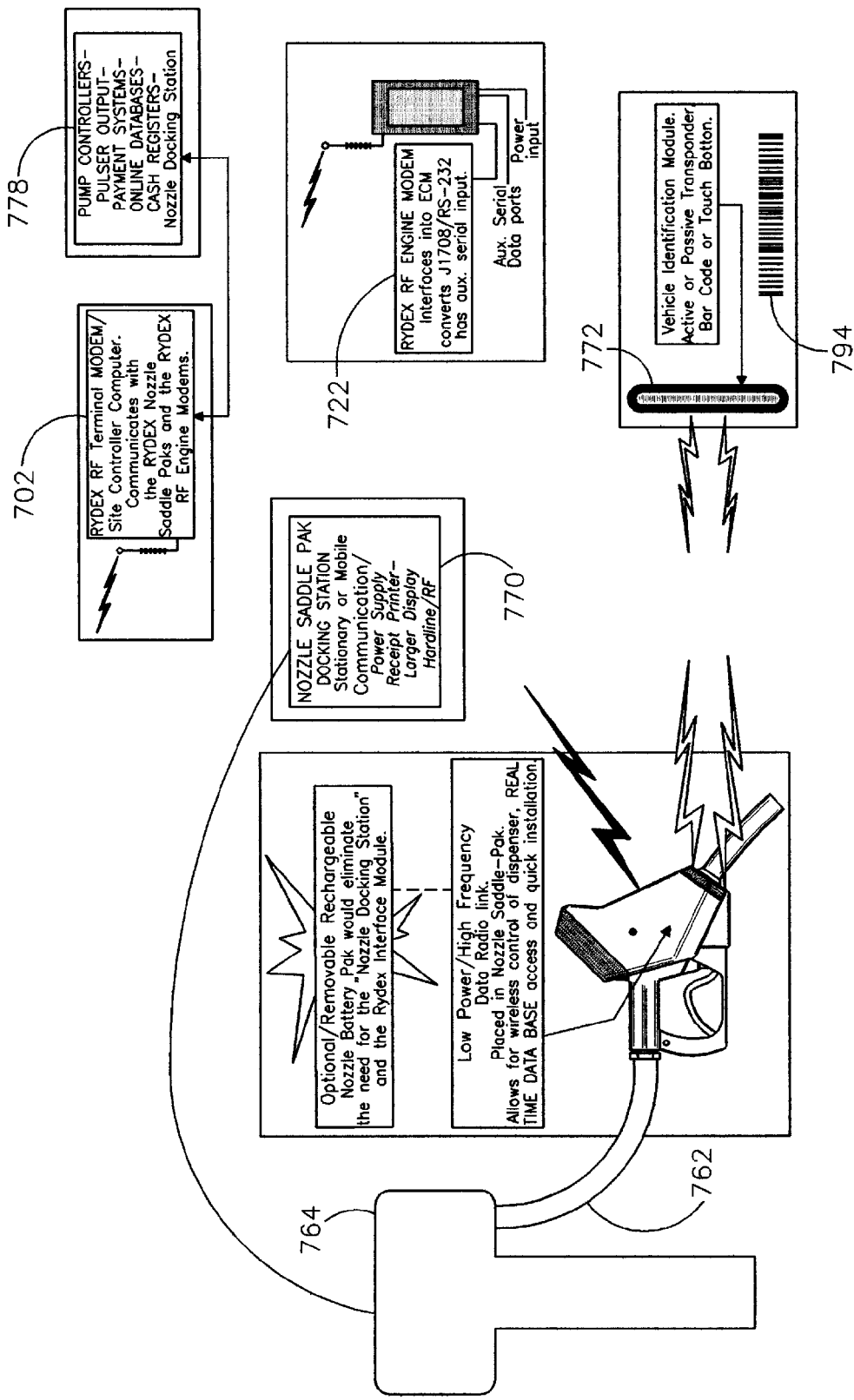
FIG. 6 is a diagrammatical view of the saddle pack and the communicative links between the saddle pack, the fluid delivery device, and the terminal site controller.

The nozzle 766 is connected by a fuel hose 762 to a stationary fuel dispenser 764 (FIG. 6). The saddle pack 768 communicates the unique identification code via radio frequency transmission to a terminal site controller 702. The terminal site controller polls the vehicle identification module 10 to receive the passive transponder identification number and diagnostics relating to the truck tractor 12. The terminal site controller 702 correlates the unique identification codes for a match and communicates the diagnostics to the saddle pack 768 which sent the unique identification code.

The terminal site controller 702 is typically located within a one hundred meter radius of the fuel dispenser 764 and is capable of storing data received from the fuel dispenser 764, the saddle pack 768 and the vehicle identification module 10.

From the terminal site controller 702, the information may either be printed out, stored until a later date, or transmitted over telephone lines or the like to the appropriate financial institution for payment to the fuel pump owner for the fluid delivery made to the truck tractor 12.

A diagrammatical view of the present invention is illustrated in FIG. 1, particularly, a preferred embodiment wherein a vehicle identification module 10 is located on board a truck tractor 12 to which is attached a first trailer vehicle 14 and a second trailer vehicle 16. During the course of operation of the truck tractor 12 and associated trailers 14 and 16, it is desirable to collect, store and transmit a variety of data regarding the vehicle via radio frequency communication. While in the preferred embodiment of the present invention information is transmitted via radio frequency communication, information may be transferred by any suitable means, including, but not limited to, hardwire, infrared, surface acoustic wave, etc. It is desirable to control refueling operations so that fuel delivered to the vehicle is properly recorded and charged, to prevent theft of fuel, and to provide an easy and convenient method for recording and communicating such information to a central processing location.

In summary, information is collected by sensors located on the truck tractor 12 and associated trailers 14 and 16, or via direct communication from outside devices, and is stored on identification modules. The vehicle identification module 10 is located on the truck tractor 12 and acts as a central collection point. A first trailer identification module 18 is located on the first trailer 14 and a second trailer identification module 20 is located on the second trailer 16. The trailer identification modules 18 and 20 are in communication with the vehicle identification module 10. Information and data collected on the trailer identification modules 18 and 20 may either be communicated at once to the vehicle identification module 10 or may be stored for later communication.

In operation, an operator will, enter the truck tractor 12 and will insert an operator identification module 22 into the truck tractor identification module 10. While this detailed description references a truck tractor 12, it should be noted that any fluid container, such as a beer keg, herbicide drum, or paint canister, may be used in the present invention. The operator's name, drivers license number, credit information and usage unique identification code will be transmitted from the operator identification module 22 to the vehicle identification module 10. The operator identification module 22 is preferably a passive transponder, but may be any other means for inputting an operator identification into the vehicle identification module 10. If the unique identification code is correctly identified by the vehicle identification module 10 as an authorized code, the operator will be allowed to start the engine and drive the truck tractor 12. During operation of the truck tractor 12, the vehicle identification module 10 will collect and record the date and time when the engine was started, miles driven by the truck tractor 12, hours of operation of the engine, and other information as will be described in further detail below.

As described above, a trailer identification module 18 is located on board the first trailer 14. The first trailer identification module 18 has recorded on it a trailer identification number and the accumulated mileage that the first trailer 14 has been pulled by a tractor. Upon connection of the truck tractor 12 to the first trailer 14, a radio frequency (RF) communication link is established between the vehicle identification module 10 and the trailer identification module 18. The vehicle identification module 10 reads from the trailer identification module 18 the trailer identification number and accumulated mileage total. Additionally, the vehicle identification module 10 authorizes the release of the air brakes of the trailer 14, as will be described in further detail below, to allow the trailer 14 to be towed behind the truck tractor 12. As the trailer 14 is towed, the distance traveled is communicated from the vehicle identification module to the trailer identification module 18 where it is used to increment the accumulated mileage. Upon disconnect of the truck tractor 12 from the first trailer 14, the accumulated mileage is written to nonvolatile memory on the trailer identification module 18 where it will be retained until the trailer 14 is again connected to a truck tractor that is equipped with the appropriate apparatus of the present invention.

The second trailer identification module 20 is located on board the second trailer 16 and functions identically to that of the first trailer identification module 18 upon its connection to the truck tractor 12 behind the first trailer 14. The trailer identification numbers, elapsed mileage on the trailers 14 and 16, and other information may be stored at the vehicle identification module 10 for bookkeeping and data collection purposes as will be described below.

The nonvolatile memory of the trailer identification modules 18 and 20 can also be used to store manifest information regarding the contents of the corresponding trailer, either when such contents are loaded or from the vehicle identification module 10. Such manifest information, as well as other information stored in the nonvolatile memory of the trailer identification modules 18 and 20, can be communicated to the vehicle identification module 10, to a remote device via a communication link, and/or to a portable storage device such as a memory key available from Datakey Corporation, Burnsville, Minn., or a passive transponder with embedded memory such as is available from Texas Instruments®, Indala®, and NDC Automation, Inc., 3101 Latrobe Drive, Charlotte, N.C.

Figure 22:
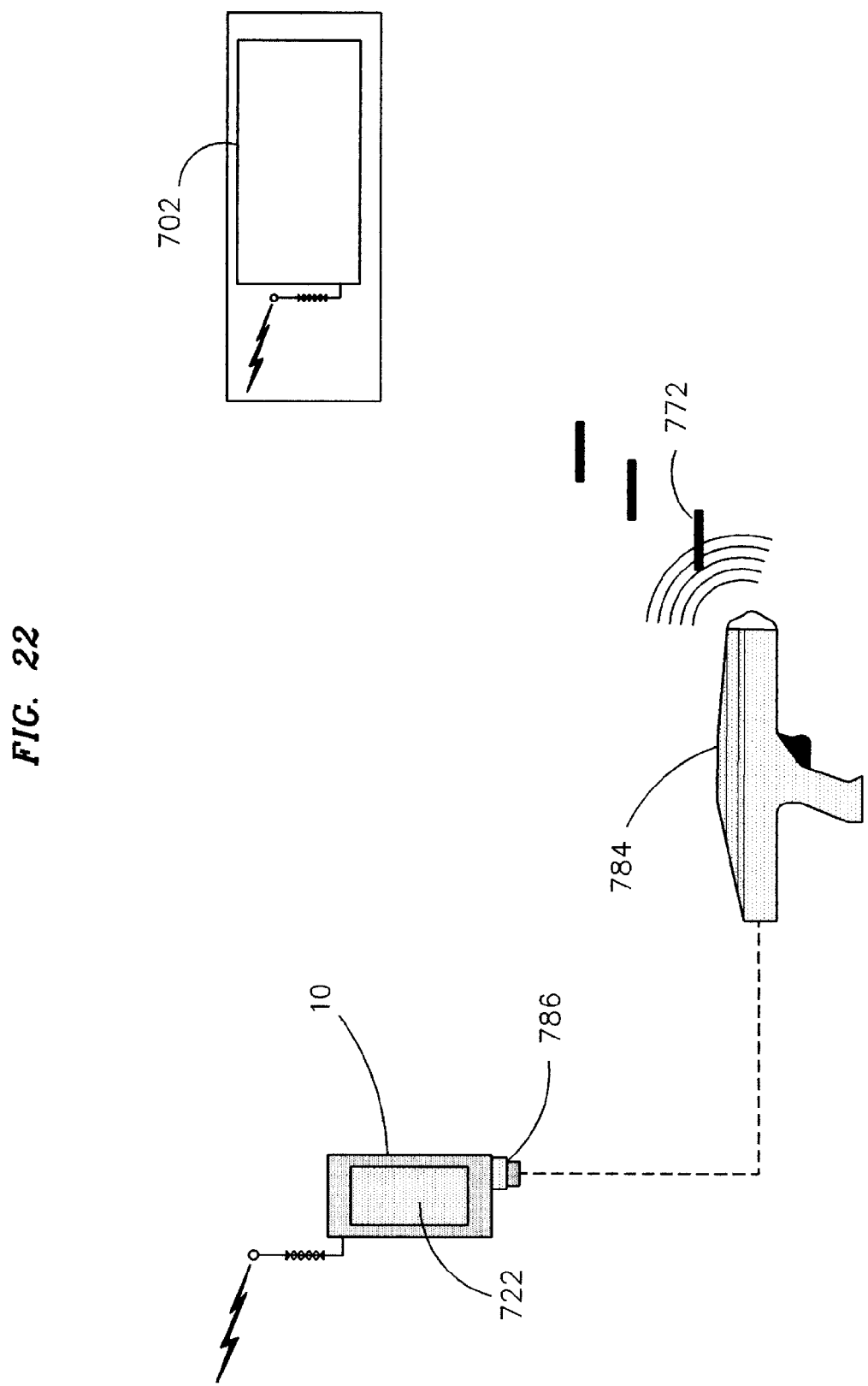
FIG. 22 is a diagrammatical view of a jumpered programming plug communicating with the vehicle identification module and the passive transponder.

As shown in FIG. 22, the passive transponder 772 and vehicle identification module 10 are preferably not directly coupled to one another. Accordingly, after the passive transponder 772 has been installed on the truck tractor 12, a hand-held transponder scanner/jumpered programmer 784 is used to poll the passive transponder 772 to read the transponder's unique factory installed identification code or an operator specified code if the transponder is read/write. The programmer 784 is preferably provided with a jumpered programming plug 786 which is plugged into a radio frequency modem 722 coupled to the vehicle identification module 10. The programmer 784 then downloads the identification code of the passive transponders 772 into the vehicle identification module 10 through the RS-232 serial port to flash memory. This procedure is repeated with all other fluid container passive transponders 772 on the truck tractor 12 until all of the unique identification codes are stored on the vehicle identification module 10 and correlated with their location on the truck tractor 12.

Figure 14:
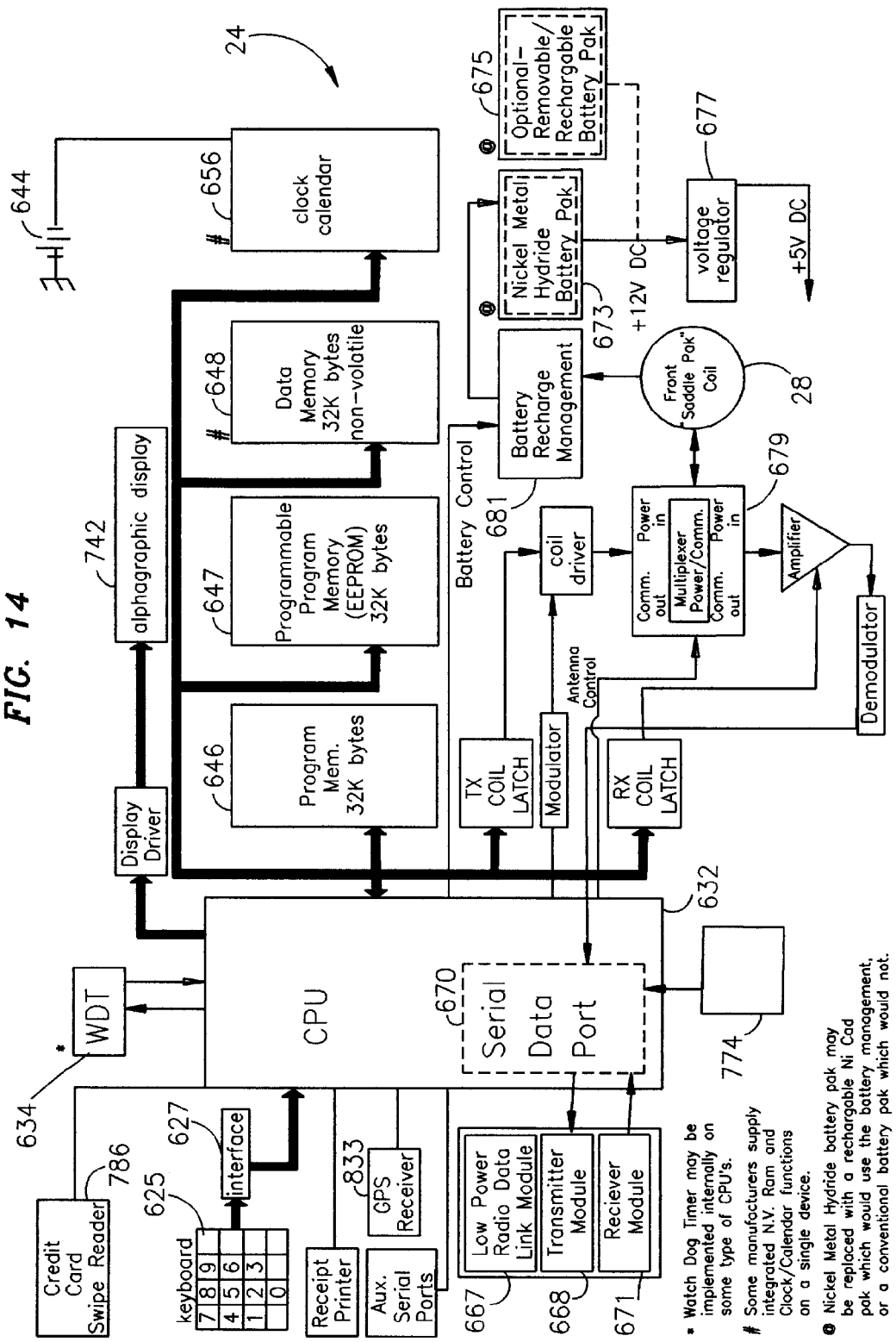
FIG. 14 is a schematic block diagram of the fuel nozzle module contained within the saddle pack of FIG. 1.

A refueling operation will now be described. In the most common situation, the truck tractor 12 will drive up to a fuel delivery location such as a fuel service station. As the truck tractor 12 approaches the fuel delivery location, the terminal site controller 702 polls the vehicle identification module 10 to receive engine diagnostics along with all of the unique identification codes of the passive transponders 772 located on the truck tractor 12. The engine diagnostics may include, inter alia, hours of engine operation, miles traveled, fuel consumed, fuel cost, dates and times of engine operation, dates and times of fueling operations, manifest information regarding the cargo carried in the vehicles, operator information, and the like. A fuel nozzle module 24 (FIG. 3) is located within a saddle pack 768 which is releasably secured to a fuel nozzle 766. The nozzle 766 is connected to a fuel dispenser 764 by a hose 762 and is used to deliver fuel to the truck tractor 12 (FIG. 6). The fuel nozzle 766 is inserted into a filler neck of a fuel tank (not shown) of the truck tractor 12 during the fueling operation. Associated with the filler neck of the truck tractor 12 is the passive transponder 772. An inductive fuel nozzle coil 28 is associated with the fuel nozzle module 24 of the saddle pack 768 to poll the passive transponder (FIGS. 3 and 14).

A passive transponder 772 (FIG. 20), stores identification information for subsequent, repeated transmission to a fluid delivery device for the purpose of authorizing a fluid delivery transaction and for record keeping purposes regarding the transaction. The passive transponder 772 has no independent battery or other power source. Operational energy is received from an active communication module, indicated generally at 1000 in FIG. 21, and associated with the fuel nozzle module 24 (FIG. 3).

Figure 20:
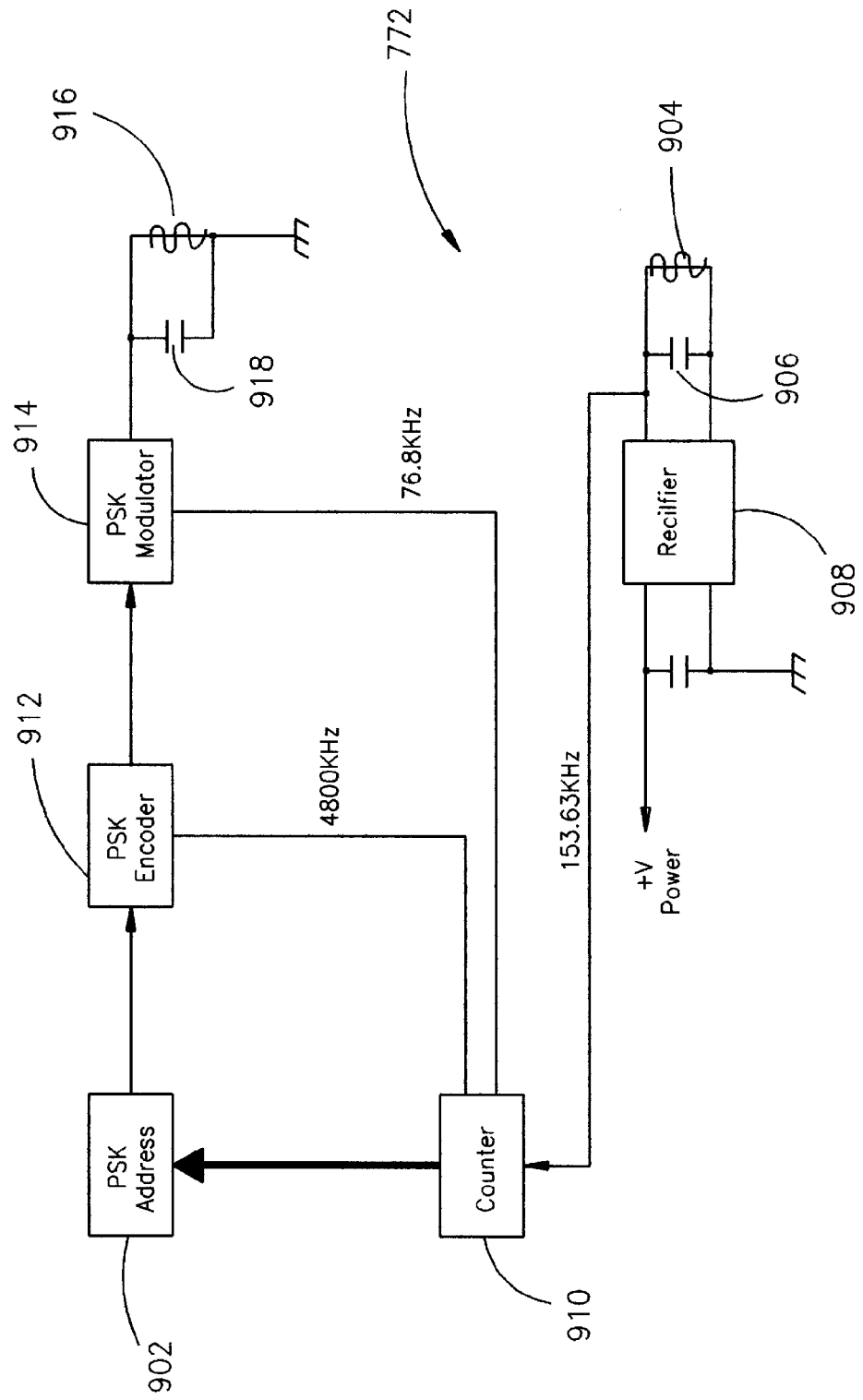
FIG. 20 is a schematic block diagram of a passive transponder associated with a fluid container.

Identification information, such as the identity of a fluid container, fluid type for the container, and equipment type is stored in a programmable, read-only memory device 902 (FIG. 20). In the preferred embodiment, 64 bits of information are stored on the PROM 902. Alternatively, the passive transponder 772 may serve as an identification device for a person rather than a fluid container. In such an instance, the information stored on the PROM 902 would be information identifying the person. In either event, the information is used for security and record keeping purposes.

Figure 21:
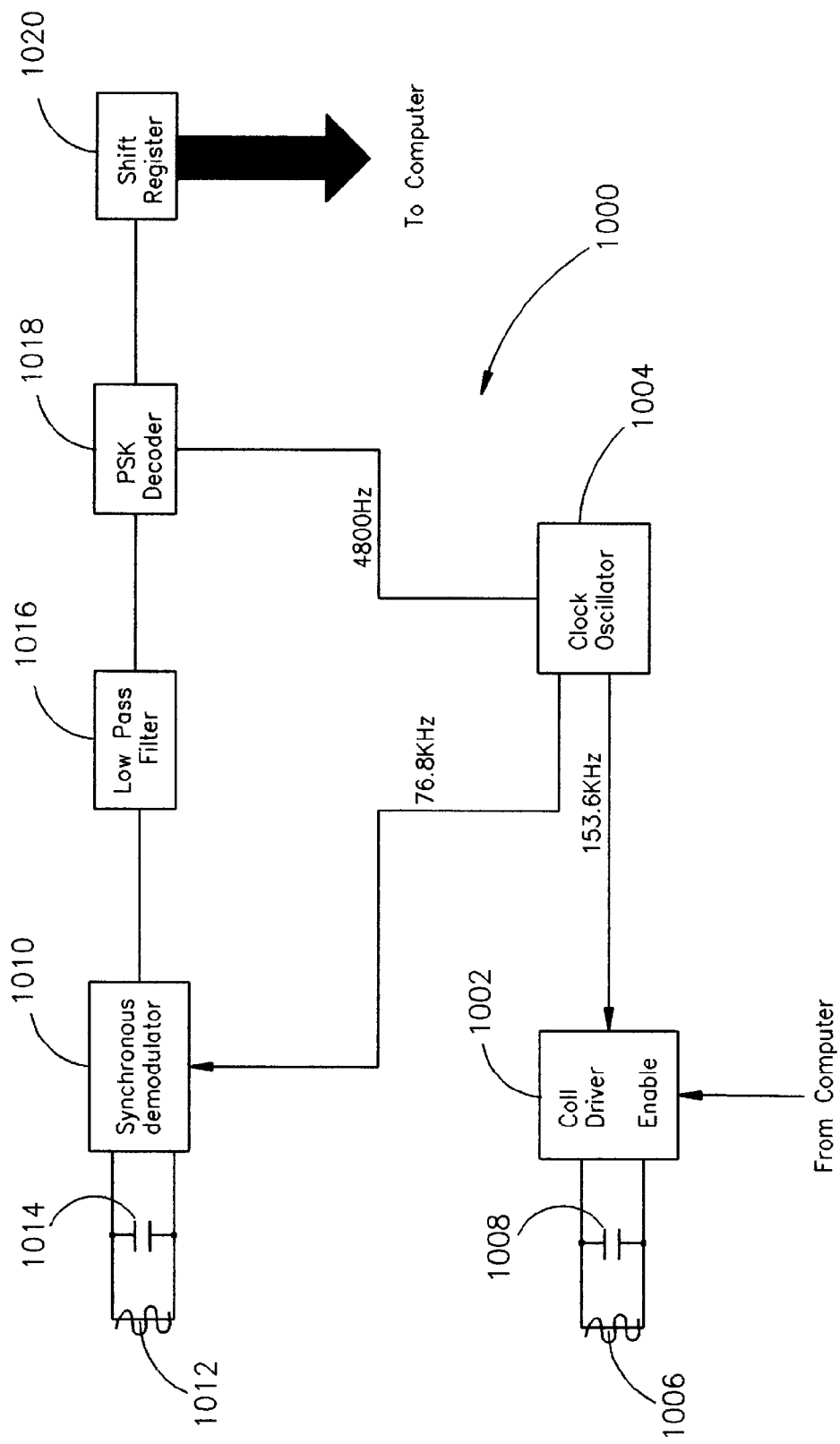
FIG. 21 is a schematic block diagram of an electrical circuit that is added to the fluid delivery module of FIG. 20 for use with the passive transponder.

Operational energy for the passive transponder 772 is transmitted from the active communication module 1000 (FIG. 21). A coil driver 1002 is connected to the CPU 532,632 or 832 in a similar manner as the coil drivers 574,674 or 474. When the coil driver 1002 is enabled, a 153.6 kHz signal from the clock oscillator 1004 drives an LC circuit including a power transmit coil 1006 and a capacitor 1008 selected to tune the LC circuit to 153.6 kHz. The power transmit coil 1006 generates an RF signal at 153.6 kHz.

The passive transponder 772 (FIG. 20) includes a power receive coil 904 across which is connected a capacitor 906 selected to tune the coil to receive the 153.6 kHz power signal. The signal is passed through a rectifier 908 which puts out a supply voltage for powering the other components of the passive transponder 772. The 153.6 kHz signal received by the power receive coil 904 is also sent to a counter 910 which controls the PROM 902 and sends a 4800 Hz signal to a phase shift key encoder 912 and a 76.8 kHz signal (one-half of 153.6 kHz) to a FSK modulator 914. The FSK encoder 912 and modulator 914 transmit the information stored on the PROM 902 through an LC circuit tuned to 76.8 kHz including a signal transmitting coil 916 and an appropriate capacitor 918. In the preferred embodiment, the 64 bits of information is transmitted in approximately 100 milliseconds.

The clock oscillator 1004 of the active communication module 1000 (FIG. 21) sends a 76.8 kHz signal to a synchronous demodulator 1010 which is connected to an LC circuit tuned at 76.8 kHz, including a capacitor 1014 and a signal receiving coil 1012. The coil 1012 may be any of the coils 26, 76 or 80 of the vehicle identification module 10 (FIG. 7), coils 126, 176 or 180 of the trailer identification module 18 (FIG. 8), coil 226 of the automotive module 11 (FIG. 9), or coil 326 of the mobile equipment module 13 (FIG. 10).

The signal from the demodulator 1010 passes through a low pass filter 1016 and through a phase shift key decoder 1018 to a shift register 1020 which is connected to the data bus of any of the CPUs 32, 132, 232, 332 or 432, depending on the application.

In a working embodiment used to identify a person, the power transmit coil 1006 and the power receiving coil 904 are approximately rectangular, having dimensions of three-fourths inch by two and one-half inches, consisting of eleven turns of thirty gauge copper wire. If a one-half amp signal is put through the power transmit coil 1006, an effective distance between the coils has been found to be approximately one-half inch, which results in a five milliamp signal at the rectifier 908 which is sufficient to power the passive identification module 772 to transmit its 64 bits of stored information.

If used to identify a fuel container, the size of the passive transponder 772 can be substantially increased to increase correspondingly the communication distance between the power receive coil 904 and the signal transmitting coil 916 and the corresponding coils of the active communication module 1000. Sufficient power can be transmitted over about six inches if the power transmit and receive coils are approximately five inches in diameter. The personal identification embodiment can be used to authorize a fuel delivery transaction to a fuel container that is not equipped with an identification module. Alternatively, the person identification embodiment can be used either in conjunction with a passive transponder 772 associated with the fuel container or any of the modules discussed above.

The passive identification module thus functions like an identification card but which can be "petted" and read at a distance, permits the components of the active communication module 1000 to be completely sealed from the environment, is tamper proof, and can identify either a fuel container or an authorized person attempting to initiate a fuel delivery transaction.

Although the passive transponder 772 is used in the preferred embodiment, the active communication module 1000 with an inductive coil 26 may be used to transmit a unique identification code. The alternative inductive coil 26 would be in direct communication with the vehicle identification module 10 and in inductive communication with the fuel nozzle module 24 via the fuel nozzle coil 28 (FIGS. 3 and 14). Voltage signals present in either active communication module 1000 or the fuel nozzle coil 28 would be transmitted to and received when the two coils are in communicating proximity. In this manner, the vehicle identification module 10 and the fuel nozzle module 24 could intercommunicate directly during a fuel delivery operation.

In an alternative embodiment of the present invention (FIG. 5), a magnetic card reader 786 is incorporated into the housing 728 of the saddle pack 768 and coupled to the fuel nozzle module 24 to allow the operator to identify the operator and/or the truck tractor 12 if either one is not equipped with a passive transponder and/or to allow for automatic payment of fuel.

In the preferred embodiment of the present invention, upon insertion of the fuel nozzle 766 into the filler neck of the truck tractor 12, the fuel nozzle module 24 sends a power signal to the passive transponder 772 (FIGS. 1 and 3). In response to the power signal, the passive transponder 772 transmits a unique identification code to the fuel nozzle module 24 together with the unique identification code of the passive transponder 772. The fuel nozzle module 24 sends the unique identification code from the saddle pack 768 via a 916.5 MHz radio signal to a terminal site controller 702. Preferably, the fuel nozzle module 24 sends the information via a low power radio data link 667 contained within the saddle pack 768. While a spread spectrum radio on a PCMCIA card has been found to work well in the present invention, any suitable communication means may be used, including, but not limited to, hardwired, cellular, lan card, or other known wireless communication means. If the terminal site controller 702 matches the unique identification code of the passive transponder with the unique identification code stored on the vehicle identification module 10, the terminal site controller 702 activates the fuel dispenser 764 via a hardwired or wireless connection. In addition to initiating fuel delivery, the terminal site controller relays the diagnostic information to the appropriate saddle pack 768 via wireless communication (FIGS. 1 and 3).

Before delivery of the fuel, the operator may input either a dollar amount or a volume amount into the keyboard 744 on the saddle pack 768. This information is transferred via radio frequency communication to the terminal site controller 702 which automatically starts fuel delivery and stops fuel delivery after the specified dollar amount or volume of fuel has been delivered. This automatic shutoff feature allows the operator to leave the fueling site during the fueling process without the risk of overfilling the truck tractor 12.

An additional saddle pack 768 may be attached to a satellite nozzle (not shown) if it is desired to fill two or more tanks of the truck tractor 12 simultaneously. Every tank of the truck tractor 12 is preferably equipped with a separate one of the passive transponders 772 with each passive transponder 772 being uniquely coded to identify a particular tank. If either nozzle 766 is removed from its respective tank, fuel delivery to that nozzle 766 is discontinued. Accordingly, if it is desired to fill two or more tanks of the truck tractor 12 simultaneously, the use of multiple saddle packs 768 and passive transponders 772 prevents the filling of an unauthorized container with the satellite nozzle while the main nozzle 766 is filling an authorized container.

During the fueling process, information relating to the cost of the fuel being delivered, the fuel type, the volume of fuel, the saddle pack code, and the station identification number is collected at the terminal site controller 702, transmitted either from the saddle pack 768 via RF communication or from the fuel dispenser 764 via a hardwired connection. Although the terminal site controller 702 is preferably used to store and transmit information back and forth from both the vehicle identification module 10 and fuel nozzle module 24, the fuel nozzle module 24 may be used to communicate directly with the vehicle identification module if the network and storage capabilities of the terminal site controller 702 are not needed.

Figure 16:
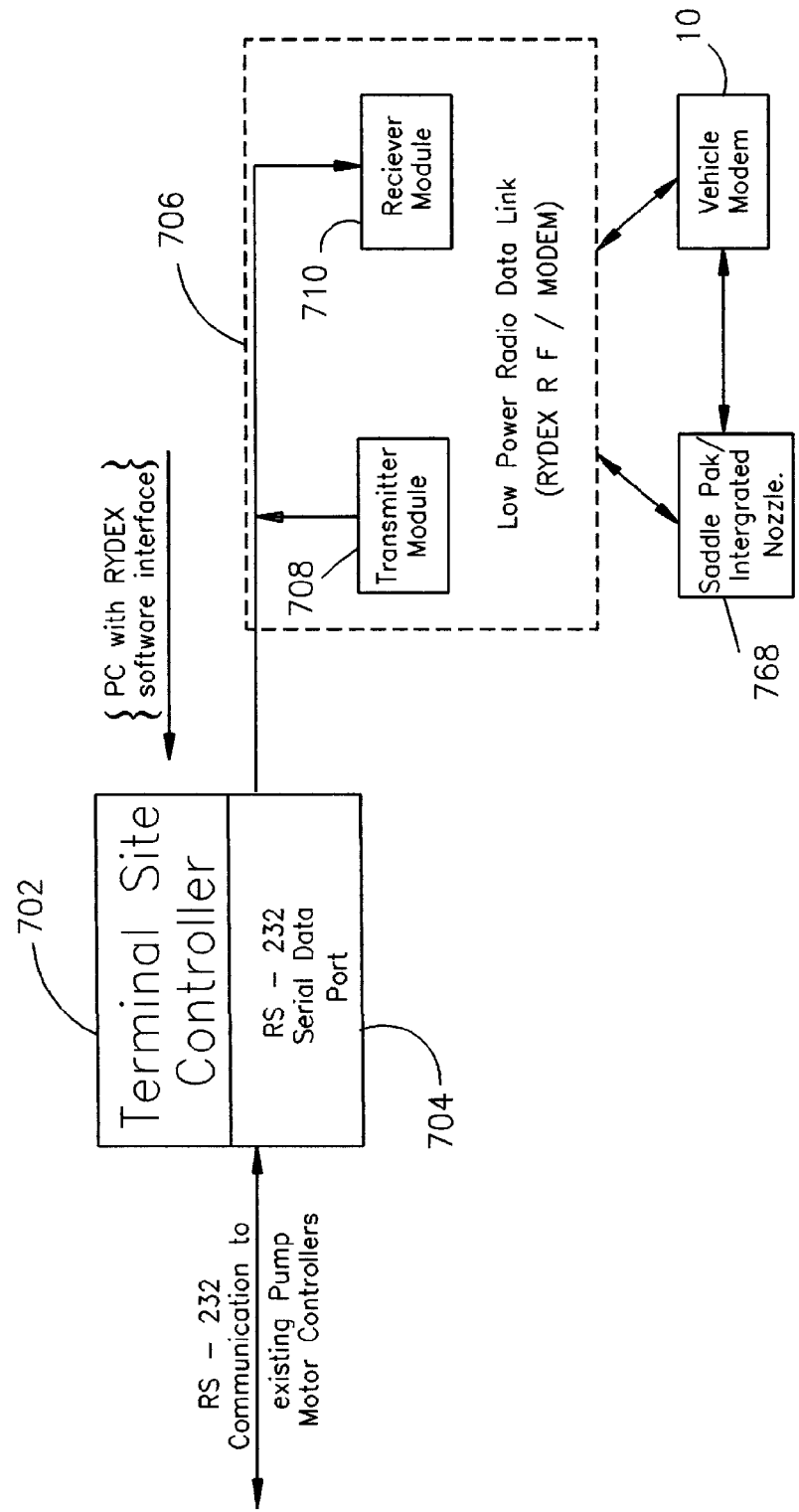
FIG. 16 is a schematic block diagram of a terminal site controller with which the saddle pack of FIG. 1 may communicate.

FIG. 16 shows the terminal site controller 702 having a serial data port 704. Preferably, the terminal site controller 702 is a personal computer (PC) coupled via RS-485 or RS-232 communication to existing pump motor controllers 778 provided within the fuel dispenser 764 or terminal site controller 702. Communication with the pump motor controllers 702 allows information regarding the type and volume of fuel delivered to be stored at the terminal site controller 702 for later use. The terminal site controller 702 is also coupled to a low power radio data link 706 having a transmitter module 708 and a receiver module 710 to provide communication with the saddle pack 768. Preferably, the PC is provided with software to allow the terminal site controller 702 to interface with the existing pump motor controllers 778 and with information received from the saddle pack 768. Preferably, the terminal site controller 702 is provided with means for archiving information regarding previous fuel deliveries and is also provided with network capabilities, either regional or nationwide, to allow data collection and recognition of various vehicles being fueled by the present invention.

Figure 4:
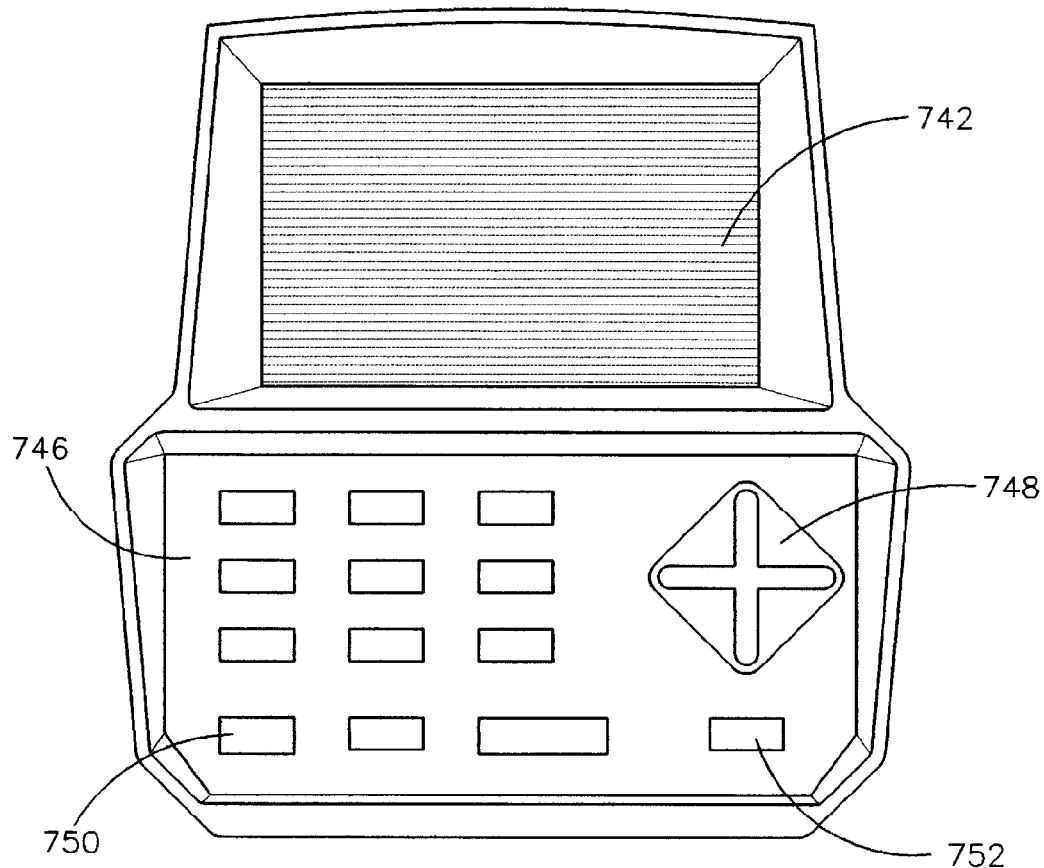
FIG. 4 is a top plan view of the display and input panel of the saddle pack of FIG. 2.

The saddle pack 768 is shown in FIGS. 2-4. As shown in FIG. 3, the saddle pack 768 is provided with a high density polyethylene injection molded housing 728 designed for receipt of the fuel nozzle 766. Preferably, the fuel nozzle 766 is provided with a valve nut 730 which allows the saddle pack 768 to be locked into place. Before the saddle pack 768 is slid over the nozzle 766, a lock cap 732 is placed over the valve nut 730. The lock cap 732 is provided with a sleeve which accommodates a lock bolt 734 after the saddle pack 768 is slid over the nozzle 766. The lock bolt 734 is inserted through the housing 728 and the sleeve of the lock cap 732 to secure the lock cap 732 and housing 728 from inadvertent removal from the nozzle 766. Preferably, the lock cap 732 is provided with a clevis 736 which grasps the lock bolt 734 and prevents its inadvertent removal from the lock cap 732. The lock bolt 734 is provided with a special head which prevents its removal without the use of a tool kept by the owner of the fueling station.

A schematic drawing of the fuel nozzle module 24 is illustrated in FIG. 14, with 600 series numbers identifying elements corresponding to the elements of the other identification modules, such as the transmitter module 669 and the receiver module 671. The fuel nozzle module 24 includes a nickel metal hydride battery pack 673 or an optional removable rechargeable battery pack 675, both of which supply twelve volts to a voltage regulator 677 which, in turn, provides five volts of DC operating current to the fuel nozzle module 24.

Figure 15:
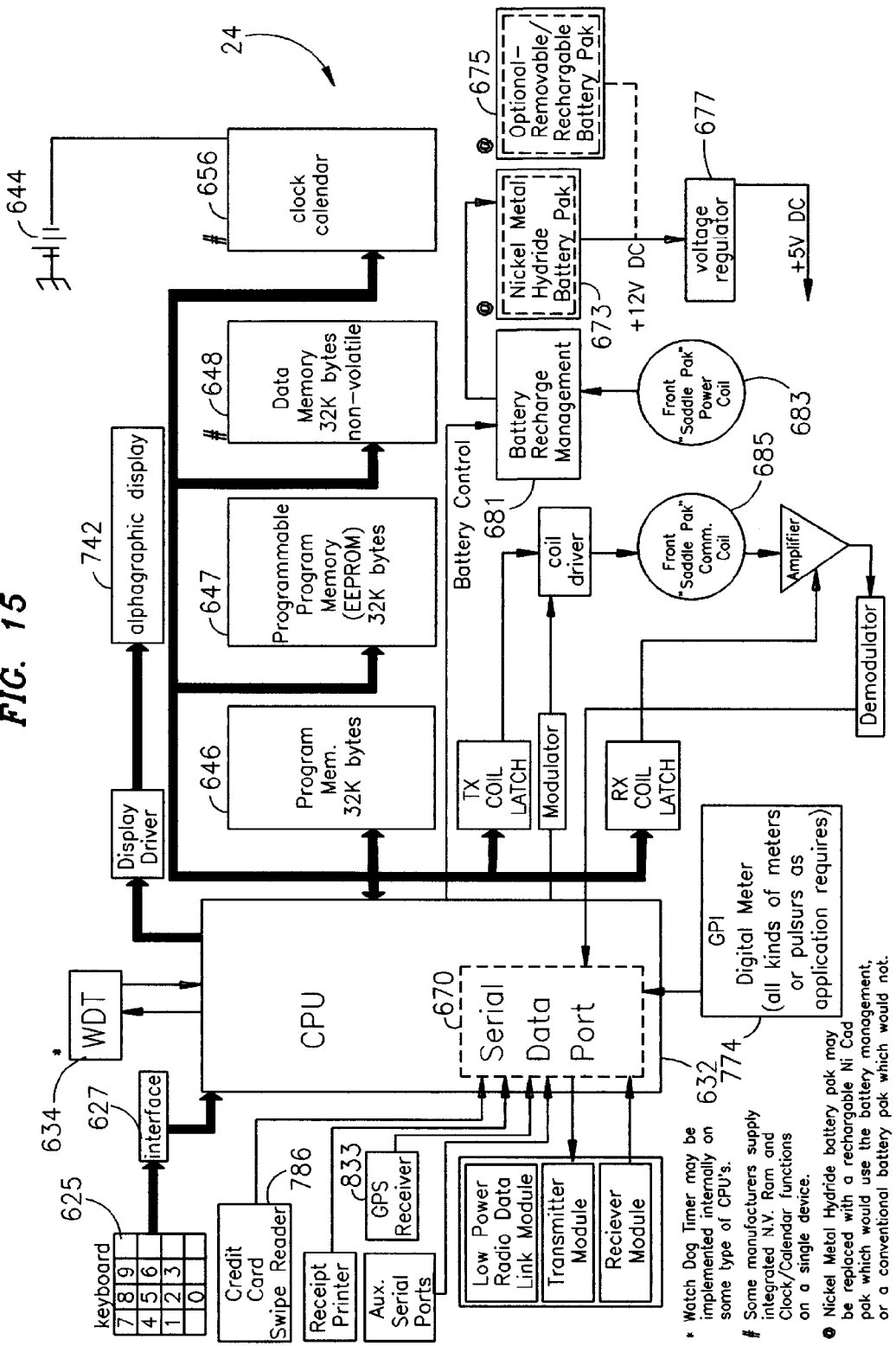
FIG. 15 is a schematic block diagram of an alternative embodiment of a fuel nozzle module contained within the saddle pack of FIG. 1.

Preferably, the coil 28 is coupled to a multiplexer 679 which toggles use of the coil 28 from charging the battery pack 673 to communicating information to and from the fuel nozzle module 24. The multiplexer 679 is coupled to a battery recharge management system 681 which charges the battery pack 673 after receiving an influx of power. As shown in FIG. 3, the fuel nozzle module 24 is located within the saddle pack 768. An alternative embodiment of the fuel nozzle module 24 is shown in FIG. 15. As shown, the multiplexer 679 is eliminated and a separate power coil 683 is provided and coupled directly to the battery recharge management system 681. A separate communication coil 685 is provided to allow the fuel nozzle module 24 to communicate information without having to provide the fuel nozzle module 24 with a multiplexer 679.

The saddle pack 768 is provided with an interface board 738 surrounded on all sides by a soft rubber boot 740 to protect the interface board 738 from jarring and damage during operation (FIG. 3). The interface board 738 has both a liquid crystal display 742 and a keyboard 744 to allow a operator to both receive and send information from the saddle pack 768. As shown in FIG. 4, the keyboard 744 is preferably provided with number keys 746 labeled zero through nine, four directional keys 748, a clear key 750, and an enter key 752. The keys are preferably self-cleaning sealed Hall-effect buttons thereby eliminating any openings in the keyboard 744 which would allow dust or corrosive material to enter the saddle pack 768. The keyboard 744 is ergodynamically constructed to allow ease of operation by a thumb of an operator as the operator is holding the nozzle 766. In accordance with this object, the clear key 750 and enter key 752 are preferably larger than the remaining keys and positioned lower on the keyboard 744 to allow ease of use.

As shown in FIG. 4, the display 742 is preferably a six-line liquid crystal display capable of supporting full graphics but may be any suitable type of display device. The display 742 may also be provided with a heater (not shown) to facilitate operation of the display 742 in cold weather. It is preferable that both the display 742 and keypad 744 are substantially impervious to corrosive fluids and ultraviolet light found around fueling stations. The saddle pack 768 is also preferably provided with a magnetic card reader 786 coupled to the fuel nozzle module 24 to allow the operator to enter information via a magnetic strip card (not shown).

As shown in FIG. 3, the nickel metal hydride battery pack 673 is positioned within the housing 728. If it is desired, a small door (not shown) may be provided in the housing 728 to provide easy removal and replacement of the battery pack 673 from the housing 728.

Also provided within the housing 728 is a master microcontroller board 754 containing the central processing unit 632 and the supporting peripherals shown in FIG. 14. As shown in FIG. 14, the keyboard 625 is interfaced with the CPU 632 as is the liquid crystal display 642.

As shown in FIG. 3, the coil 28 is provided within the housing 728 and completely surrounds the nozzle 766. This preferred positioning of the coil 28 allows for communication of the coil 28 with the truck tractor 12 during a fueling operation. It also allows the coil 26 to transmit operational energy to the battery pack 673 during docking of the nozzle 766. It should be noted that while placement around the nozzle 766 is preferred, any positioning which allows communication of the coil 28 with the truck tractor 12 may be used.

Figure 5:
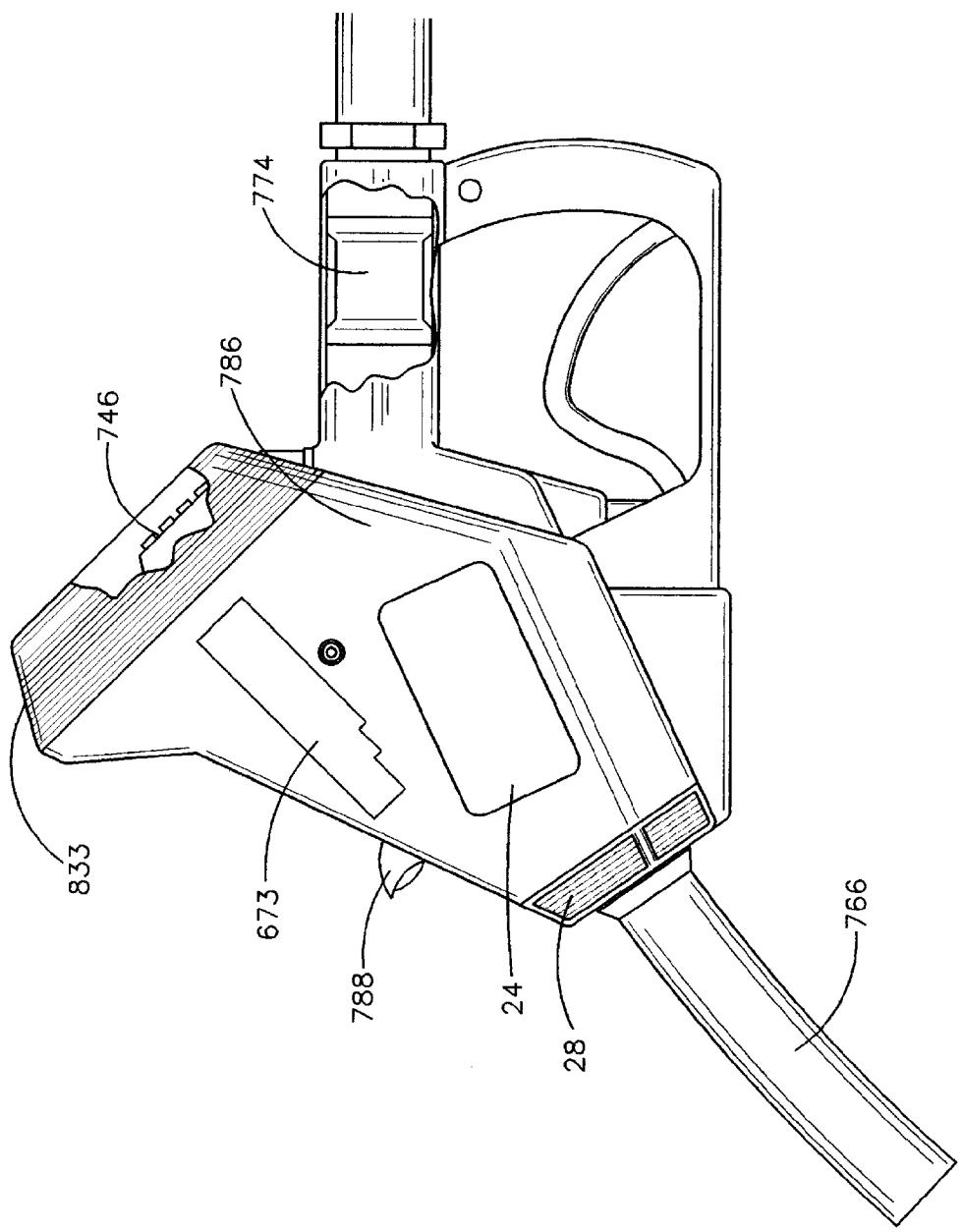
FIG. 5 is a side elevation in partial phantom showing an alternative embodiment of the present invention having a flow meter integrated into the fluid delivery nozzle.
Figure 7:
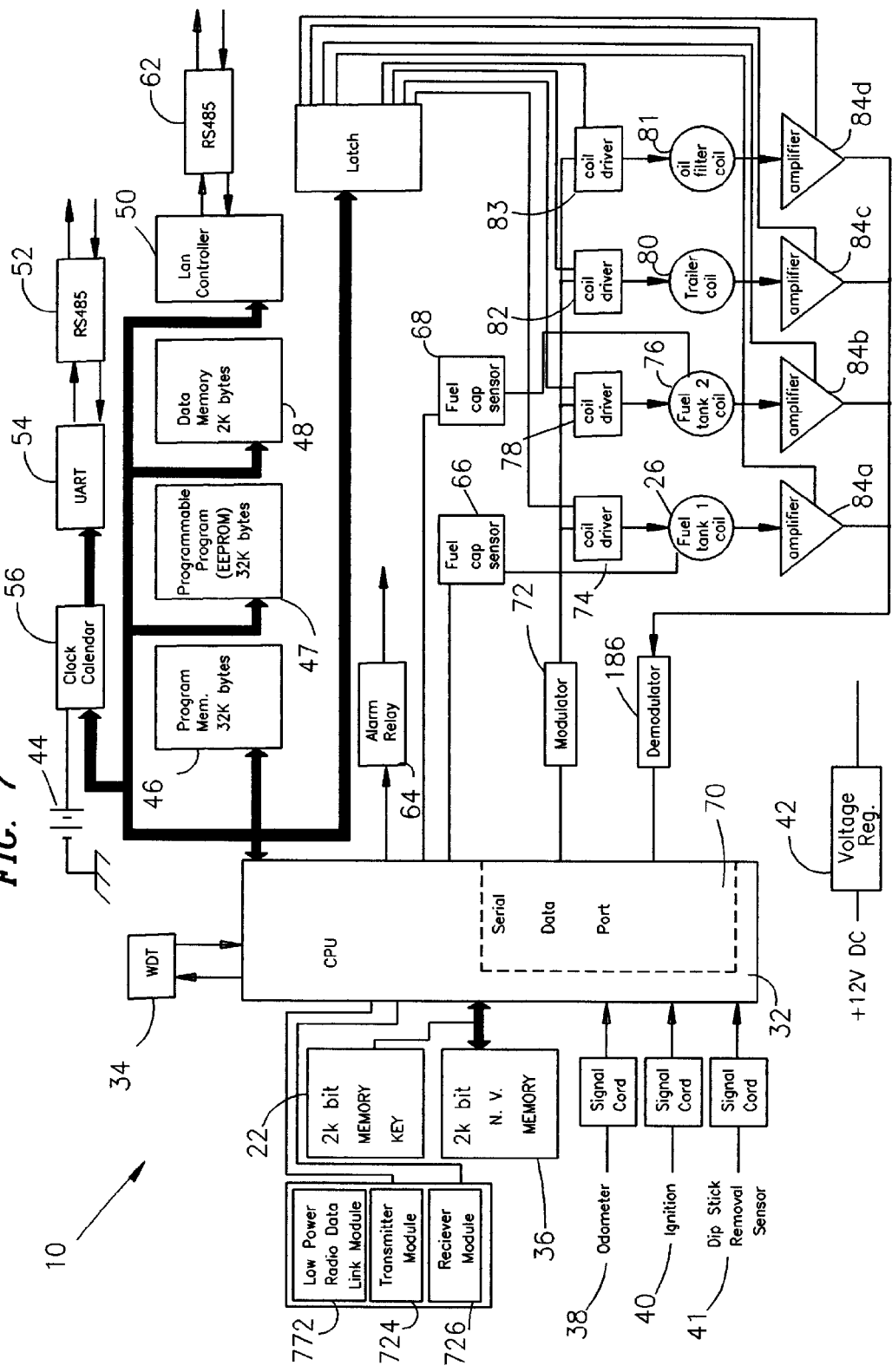
FIG. 7 is a schematic block diagram of a central processing unit and peripherals of a truck tractor vehicle identification module with which the saddle pack of FIG. 2 may communicate.

In an alternative embodiment of the present invention, the fuel nozzle module 24, keyboard 744, display 742, and battery pack 673 are integrated into the nozzle 766 thereby eliminating the saddle pack 768 (FIG. 5). Additionally, a magnetic card reader 786 and a laser bar code reader 788 may be integrated into the nozzle 766 to allow credit card information to be downloaded to the fluid nozzle module 24 and to allow a standard bar-code 794 to be substituted for the passive transponder 772 (FIGS. 5 and 6). By integrating the nozzle 766, the hardwire connection between the terminal site controller 702 and the pump pulser can be eliminated. Replacing this connection is a turbine flow sensor 774 which is positioned within the nozzle 766 along the path of fluid flow. A self-contained turbine flow sensor frequency generator manufactured by Great Plains Industries, Inc. of Wichita, Kans., is preferable for petroleum delivery. If a material other than gasoline is dispensed, such as oil, a Graco® in-line electronically metered valve or similar oil metering device may be used. The turbine flow sensor 774 is hardwired to the fuel nozzle module 24 to allow transmission of fuel delivery information to the fuel nozzle module 24. As fuel flows past the turbine flow sensor 774, the frequency generator within the turbine flow sensor sends pulses to the fuel nozzle module 24 for each incremental amount, e.g. (one tenth of one gallon) that flows past the turbine flow sensor 774. From the terminal site controller 702, information relating to the truck tractor 12 is transmitted via a 916.5 MHz radio signal to the fuel nozzle module 24. Similarly, information relating to the fuel delivery may be transferred from the terminal site controller 702 to the vehicle identification module 10 via a 916.5 MHz radio signal (FIGS. 7 and 16). Preferably, the terminal site controller 702 subsequently transmits the information, e.g., over telephone lines, to the owner of the truck tractor 12 and, in certain circumstances, to the appropriate financial institution for payment to the fuel pump owner for the fuel delivery made to the truck tractor 12 (FIGS. 1 and 16).

At short intervals during the fuel delivery operation, the fuel nozzle module 24 continues to inquire for the unique identification code from the passive transponder 772. If the appropriate unique identification code is not received, the fuel nozzle module 24 will send a signal to the terminal site controller 702 to turn off the pump motor controllers of the fuel dispenser 764 and in this way prevent delivery of fuel to an unauthorized vehicle or fuel tank and prevent fuel loss if the nozzle 766 becomes inadvertently dislodged from the filler neck (FIGS. 1, 7 and 16).

A schematic diagram of the vehicle identification module 10 showing the optional active transponder wiring is illustrated in FIG. 7. The active transponder wiring, however, may be eliminated if the passive transponder 772 is used. Principal control of the vehicle identification module 10 is accomplished by a central processing unit 32 to which is attached a watch dog timer 34. Information or data from the operator identification module 22, memory key, other passive transponder, or touch button is communicated both to the CPU 32 and to a 2K bit nonvolatile memory storage device 36 where it will be stored for access by the CPU 32. Odometer and engine hour information is communicated to the CPU 32 from sensors 38 and 40, respectively.

Power voltage is supplied to the CPU 32 through a 5-volt output voltage regulator 42 connected to the 12 volt electrical system of the truck tractor. Instruction coding or programs for the operation of the CPU 32 are stored on a 32K byte memory device 46 and a 2K byte data memory device 48 is provided for the storage of data collected and processed by the vehicle identification module 10 (FIG. 7). A 32K byte programmable memory device (EEPROM) 47 serves as a means for modifying or updating the program for controlling the operation of the vehicle identification module 10. If the program originally stored on the 32K byte RAM device 46 is to be changed, a new program can be stored on the EEPROM 47 via an appropriate communication link (including the inductive coils described below). The new program will include the instructions necessary to effectively debilitate the original program stored on the RAM device 46. In this way, the program can be changed, altered, or updated as desired and from a remote location without substitution of a memory chip or device. The data bus 58 handles the communication of data and instructions between various elements of the vehicle identification module 10.

Communication between the vehicle identification module 10 and an on board computer 32 is accomplished through an RS232 communication link 52 which is connected to an SAE bus of the on-board computer system (FIGS. 1 and 7). The RS485 communication link 52 communicates with a UART 54 which in turn communicates with a clock calendar 56. The memory devices 46 and 48, the LAN controller 50 and the clock calendar 56 are all connected to the central processing unit 32 by way of a communication bus 58. In the preferred embodiment of the present invention, the fuel containers of the truck tractor 12 are all provided with uniquely coded passive transponders 722 and the hardwired connections to the fuel containers shown in FIG. 7 are not used.

In an alternative embodiment of the present invention, wherein active rather than passive transponders are employed, the vehicle identification module 10 is connected to four antennae (FIGS. 1 and 7). A fuel tank inductive coil 26 is associated with one of the fuel tanks of the truck tractor 12 and a second fuel tank coil 76 is associated with a second fuel tank. The association is preferably a hardwired connection, but may be a wireless connection. A third coil, the trailer coil 80, is mounted at the rear of the truck tractor 12 for communication with the trailer 14 as described above. The vehicle identification module 10 includes an appropriate receptacle for a 2K bit memory key 22 from which is downloaded the operator identification code and company unique identification code. A 2K bit nonvolatile memory device 36 contains the identification code of the vehicle identification module 10 and the fuel type required by the truck tractor 12.

In this alternative embodiment, the fuel tank coil 26 is positioned near the filler neck of a fuel tank of the truck tractor 12 (FIGS. 5 and 7). Voltage signals from a serial data port 70 of the central processing unit 32 are communicated to the fuel tank coil 26 through a modulator 72 and a coil driver 74. A signal present at the coil driver 74 will be communicated to the fuel tank coil 26 if the latch 60 has provided the appropriate enable signal to the coil driver 74. A second fuel tank coil 76 is provided which is driven by a second coil driver 78. Communication between the truck tractor 12 and the trailer 14 may be accomplished by a trailer coil 80 and a corresponding coil driver 82 as will be described in more detail below. An oil filler neck coil 81 is provided near the engine oil filler neck (not shown) of the engine which is driven by a coil driver 83. Of course, the coil drivers 74, 78, 82, and 83 are also enabled by signals from the latch 60.

The coils 26, 76, 80, and 81 can also function as receivers. Voltage signals induced in the coils 26, 76, 80, and 81 are amplified in an amplifier 84a-84d and are communicated to the serial data port 70 of the central processing unit 32 through demodulator 86 provided the appropriate enable signal has been received by the amplifier 84a-84d from the latch 60.

In this alternative embodiment, the fuel tank coils 26 and 76 are made of thirteen six-inch diameter turns of twenty-six gauge copper wire that are embedded in a silastic rubber potting material surrounded by a polyethylene cover (FIG. 7). A 0.1 micro farad capacitor is connected across the lead wires of the coil. Together the capacitor and inductance of the coil create a tuned circuit resonant at approximately sixty-one kilohertz. The drive signal is at approximately five volts, peak-to-peak and a frequency of 60 kilohertz for a binary one. The fuel nozzle coil 28 is similarly constructed so that the coils 28 and 26 or 76 are matched for efficient intercommunication (FIGS. 7 and 14). In tests, the coils 28 and 26 of 76 described above have a read-write distance of approximately eighteen inches. This limitation on communicative proximity is desirable for the security purposes noted above. In other circumstances where the read-write distance must be greater, for example if the intercommunication coils are mounted on facing surfaces of the truck tractor and an adjacent trailer, a larger diameter coil can be constructed and will function at the above frequencies provided the tuned circuit of the coil and capacitor remains at substantially the same frequency. A pair of fourteen-inch diameter coils have a read-write distance of approximately six feet.

In the active transponder embodiment of the present invention, a latch 60 is connected to the communication bus 58 and used to operate the several input and output devices. Additionally, the data bus 58 can communicate with an on-board computer 32 such as a data collection device sold by Xata Corporation, Burnsville, Minn., via a second RS485 communication link 62. An alarm relay 64 is connected to the CPU 32 and operated thereby to sound an alarm (not shown) if an alarm condition is sensed by the central processing unit 32. A pair of fuel cap sensors 66 and 68 are connected to the central processing unit 32 to send a signal when the corresponding fuel cap has been removed to permit access to a fuel tank of the truck tractor 12. An oil dipstick removal sensor 41 is connected to the CPU 32 to record the date, time, and operator identification on the vehicle identification module 10 of each time the oil dipstick of the tractor 12 is removed during the monitoring of the oil level.

Figure 17:
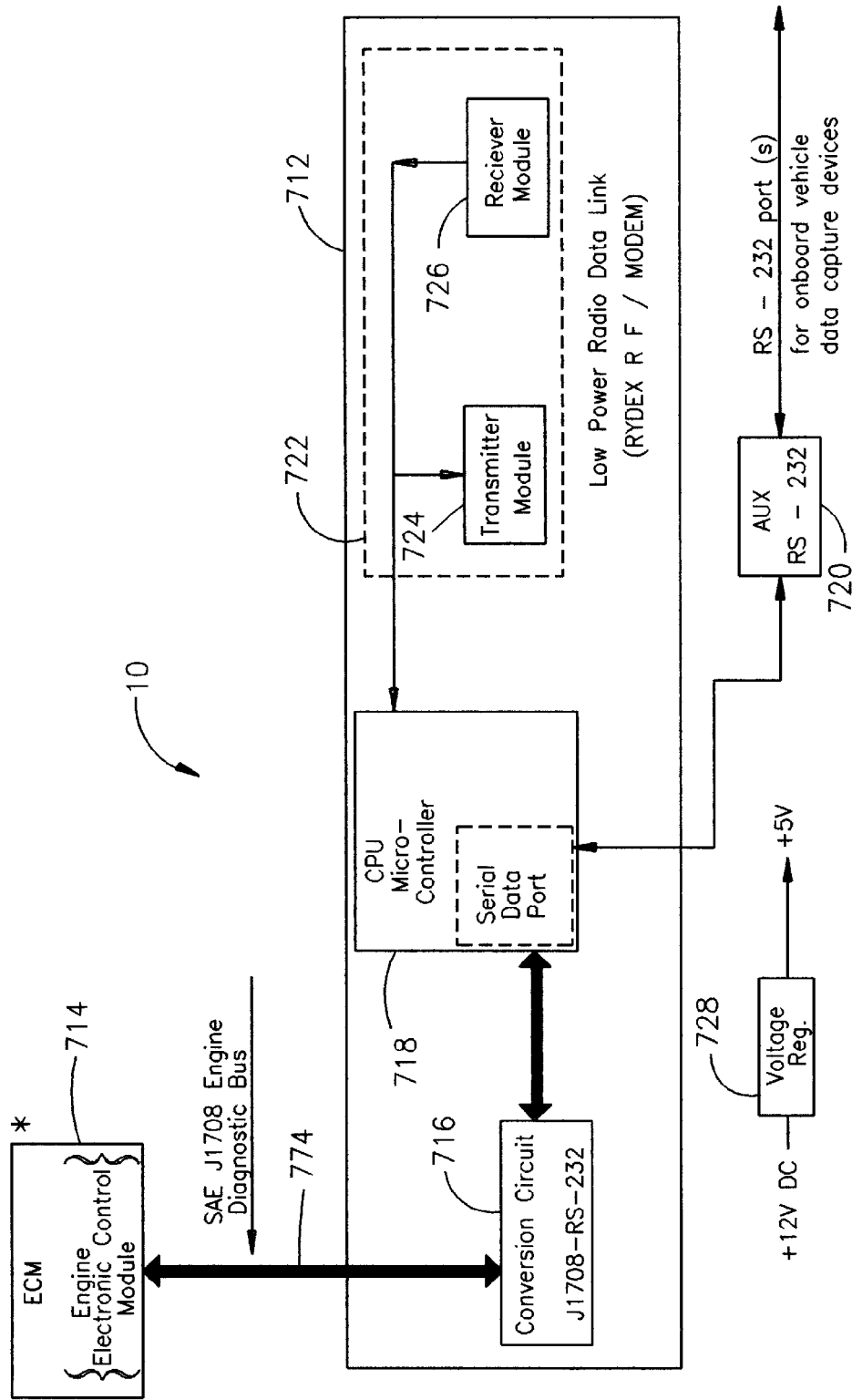
FIG. 17 is a schematic block diagram of a vehicle identification module of the vehicle of FIG. 1.

FIG. 17 shows a vehicle transmission module 712 of the preferred embodiment of the present invention coupled to the existing Engine Control Module (ECM) 714 of the truck tractor 12. This coupling allows the truck tractor 12 to be quickly adopted for use with the present invention. The engine transmission module 712 is provided with a conversion circuit 716 to provide information in a readable form for the CPU 718 to which the conversion circuit 716 is coupled.

The CPU 718 is also operably coupled to an auxiliary RS232 device 720 which receives information from RS232 onboard vehicle data capture devices (not shown) and relays them to the CPU 718. Also secured to the CPU 718 is a radio frequency modem 722 provided with a transmitter module 724 and a receiver module 726 for transmitting and receiving information via RF communication. The transmitter module 724 eliminates the optional hardwired connection of the CPU to the inductive coil 26 provided around the filler neck. By eliminating the need for hardwiring an inductive coil around the filler neck of the truck tractor 12 thereby providing an easier installation of the present invention on existing vehicles.

To assure security is maintained and that fuel is not delivered to an unauthorized vehicle, the passive transponder 772 is secured close to the filler neck of the truck tractor 12. The radio frequency modem 722 communicates information via RF communication to the terminal site controller 702. Throughout the fueling operation, the saddle pack 768 constantly inquires or "pets" the passive transponder 772 in one second intervals to assure that the nozzle 766 has not become inadvertently removed from the filler neck or that an operator is attempting to deliver fuel into an unauthorized container. Power is supplied to the engine transmission module 712 through a voltage regulator 728 which converts twelve-volt direct current into five-volt direct current. Preferably, the saddle pack 768 is designed to communicate with both active and passive devices to accommodate whichever device is provided around the filler neck of the truck tractor 12. If ease of installation is a priority, a passive device is used; if complex data transmission directly from the vehicle identification module 24 to the filler neck is a priority, an active device is used.

In the preferred embodiment of the present invention, the vehicle identification module 10 will function essentially as a communication link between the terminal site controller 702 and the ECM 714 (FIGS. 1 and 7). If no on board computer system is present, sensors transmit odometer and engine hour information to the central processing unit 32 of the vehicle identification module 10. A conversion box 716 may be interfaced with an SAE J1708 Engine Diagnostic Bus 715 to allow the engine diagnostics to be converted to RS-232 and downloaded (FIG. 17).

Figure 8:
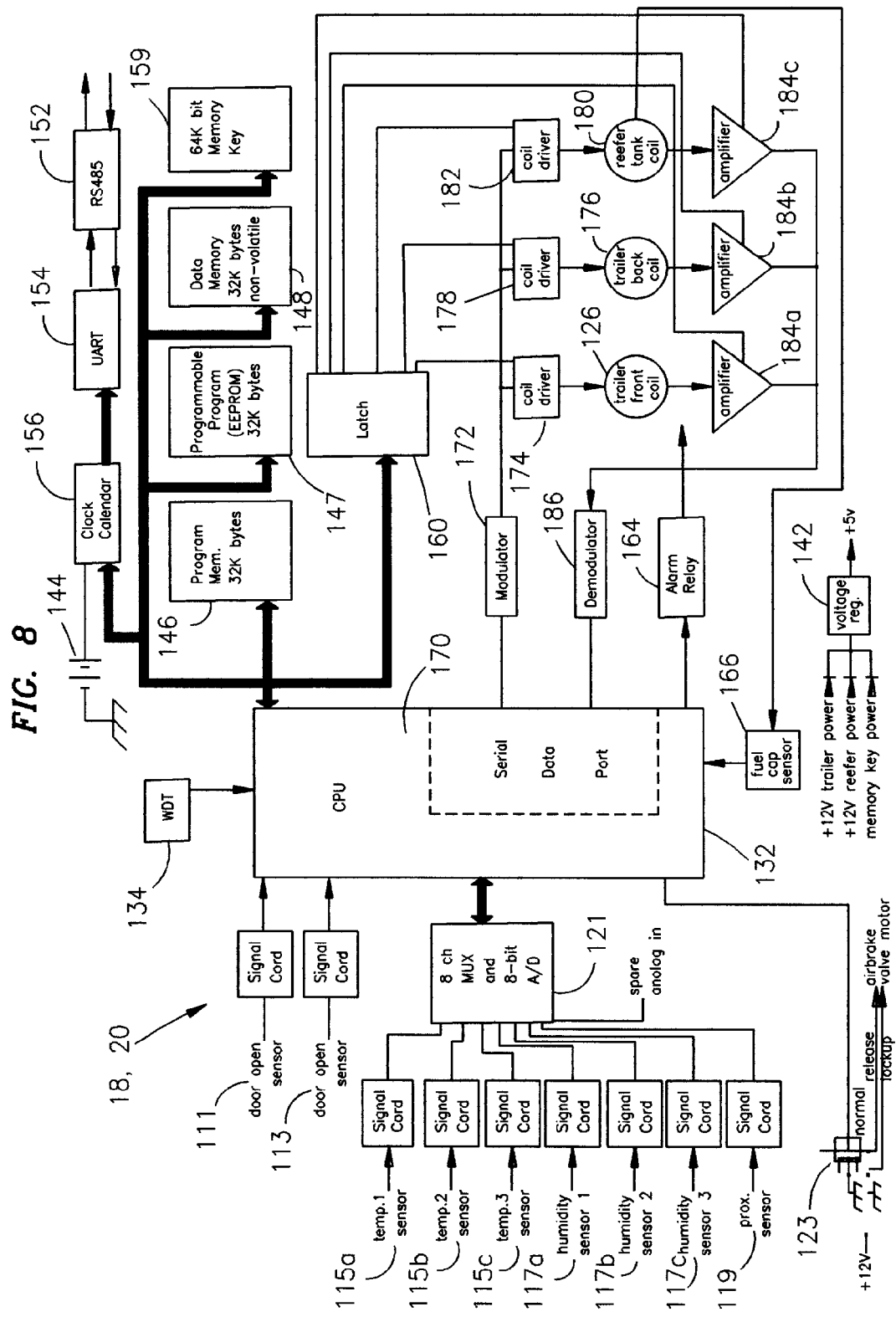
FIG. 8 is a schematic block diagram of a truck trailer identification module with which the truck tractor vehicle identification module may communicate.

A schematic diagram of the trailer identification modules 18 and 20 is illustrated in FIG. 8. Many of the principal elements of the trailer identification modules 18 and 20 are identical to that of the vehicle identification module 10 and are denoted with 100 series numbers corresponding to the numbers assigned to corresponding elements of the vehicle identification module 10 (FIGS. 7 and 8), such as the amplifiers which are labeled 184a-184c. Also attached to the data bus 158 is a 64K bit memory key device 159 which can be used to transmit up to 64K bits of information from the memory key device 159 to the trailer identification module 18 or 20 or which can store up to 64K bits of information from the trailer identification module 18 or 20. The trailer identification module 18 or 20 monitors the condition of a pair of doors of the trailer 14 or 16, respectively, by way of door open sensors 111 and 113 which are connected to the central processing unit 132. A plurality of other sensor or transponder units such as the temperature sensors 115a-115c, humidity sensors 117a-117c and a proximity sensor 119, are used to monitor the temperature and humidity inside the trailer 14 and, with respect to the proximity sensor 119, the proximity of the rear of the trailer 14 to an unloading device or location. The sensors 115a-115c, 117a-117c, and 119 are analog sensors which produce voltage signals corresponding to the conditions they are sensing. The analog signals are conditioned and sent to an 8-channel multiplexer and analog digital converter 121 which provides an interface between the central processing unit 132 and the sensors so that information collected by the sensors can be stored or processed by the central processing unit 132. Additional sensors or transponders could be used for sensing engine operating parameters of the reefer power unit, for example. In the event greater than eight sensors or transponders are used additional multiplexer channels can be added. Newer model vehicle engines equipped with an engine electronic control module 714 could interface into the SAE J1708 Engine Diagnostic Bus 715.

A motor driven valve 123 for the control of the air brakes of the trailer 14 is illustrated in FIG. 8. If no signal is received from the central processing unit 132, the motor drive valve 123 will remain closed and thus prevent the air brakes from releasing. The brakes of the trailer 14 will thus be applied and prevent the trailer 14 from being moved by a tractor unit. Only if a signal is received from the CPU 132 will the motor driven valve 123 open to permit release of the air brakes and movement of the trailer 14. At unhook of the trailer 14 from the tractor 12, the motor driven valve 123 must be driven closed by the operator while a safety button is held closed. Once driven closed, the motor driven valve 123 can only be released if it receives the proper unique identification code from the vehicle identification module 10.

Figure 9:
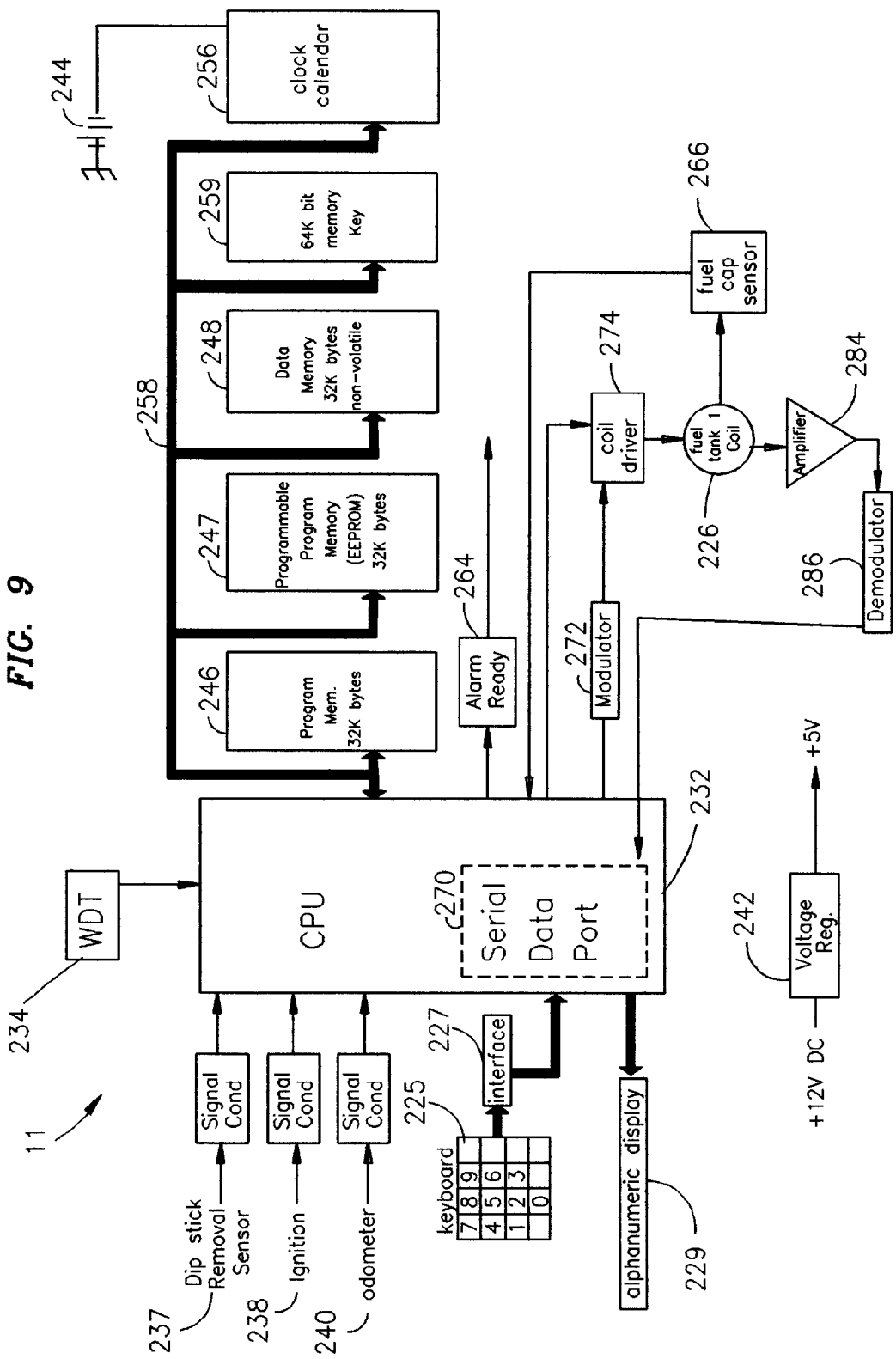
FIG. 9 is a schematic block diagram of an automobile identification module with which the saddle pack of FIG. 2 may communicate.
Figure 10:
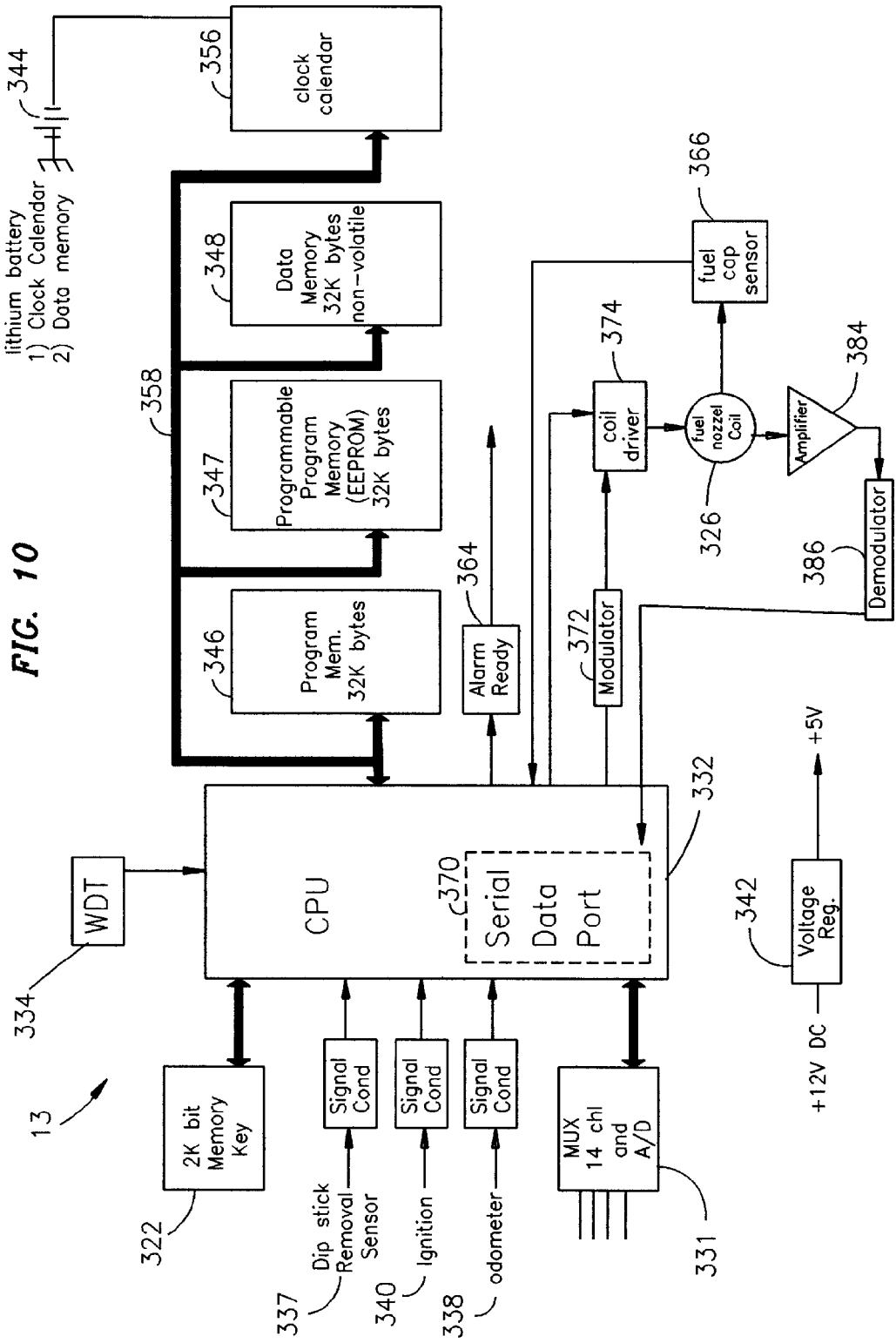
FIG. 10 is a schematic block diagram of a mobile equipment identification module with which the saddle pack of FIG. 2 may communicate.

An automotive module 11 that is similar in construction and operation as the vehicle module 12 is illustrated schematically in FIG. 9 with 200 series figure numbers used to identify elements of the automotive module 11 that correspond to elements of the vehicle identification module 10 and trailer identification module 18. An oil dipstick removal sensor 237 has been added to record the time and date of removal of the oil dipstick, presumably to check the engine oil level. Additionally, a keyboard 225 and interface 227 are provided for the manual input of information to the central processing unit 232. An alphanumeric display 229 is also provided to display information being input from the keyboard 225 and information coming from the central processing unit 232.

It may be desired to use the present invention to monitor the use and operation of the vehicles other than a truck tractor and trailer. For example, an identification module similar to the vehicle identification module 10 and vehicle identification module 11 may be provided on mobile equipment such as a tractor, road grader, dump truck, or any other piece of mobile equipment. A mobile equipment identification module 13 is illustrated schematically in FIG. 10 with 300 series numbers identifying elements of the mobile equipment identification module 13 that correspond to elements of the identification modules 10 and 11.

The vehicle identification module 10 thus functions as an information storage and retrieval device for operating and environmental conditions of the trailers as well as manifest information regarding cargo carried in the trailers. This capability of the vehicle identification module 10 is of particular utility for storing other information unrelated to a fuel delivery transaction. For example, service operations performed on the vehicle can be stored on the vehicle identification module to provide an accumulated service history of the vehicle that is carried with the vehicle itself. In another application, a device similar to the trailer identification module 18 or 20 could be associated with an underground storage tank. Sensors or transponders for detecting the presence of leaking fuel from the underground storage tank would be connected to the CPU 132 in the same manner as the sensors 115a-115c, 117a-117c, and 119 shown in FIG. 8. The underground storage tank module would thus function as an automatic leakage monitoring system in addition to its two-way fuel delivery transaction identification and storage and network capabilities. A passive transponder is preferably provided near a filler neck of the underground storage tank to receive information from the tank during fueling.

In addition, a 4-channel multiplexer and analog digital converter 331 is provided for the purpose of permitting the storage and processing of information from transponders or sensors as may be appropriate for the particular piece of mobile equipment to which the identification module 13 is attached. In other respects, the mobile equipment identification module 13 will function similarly to the identification modules 10 and 11 described above.

Figure 11:
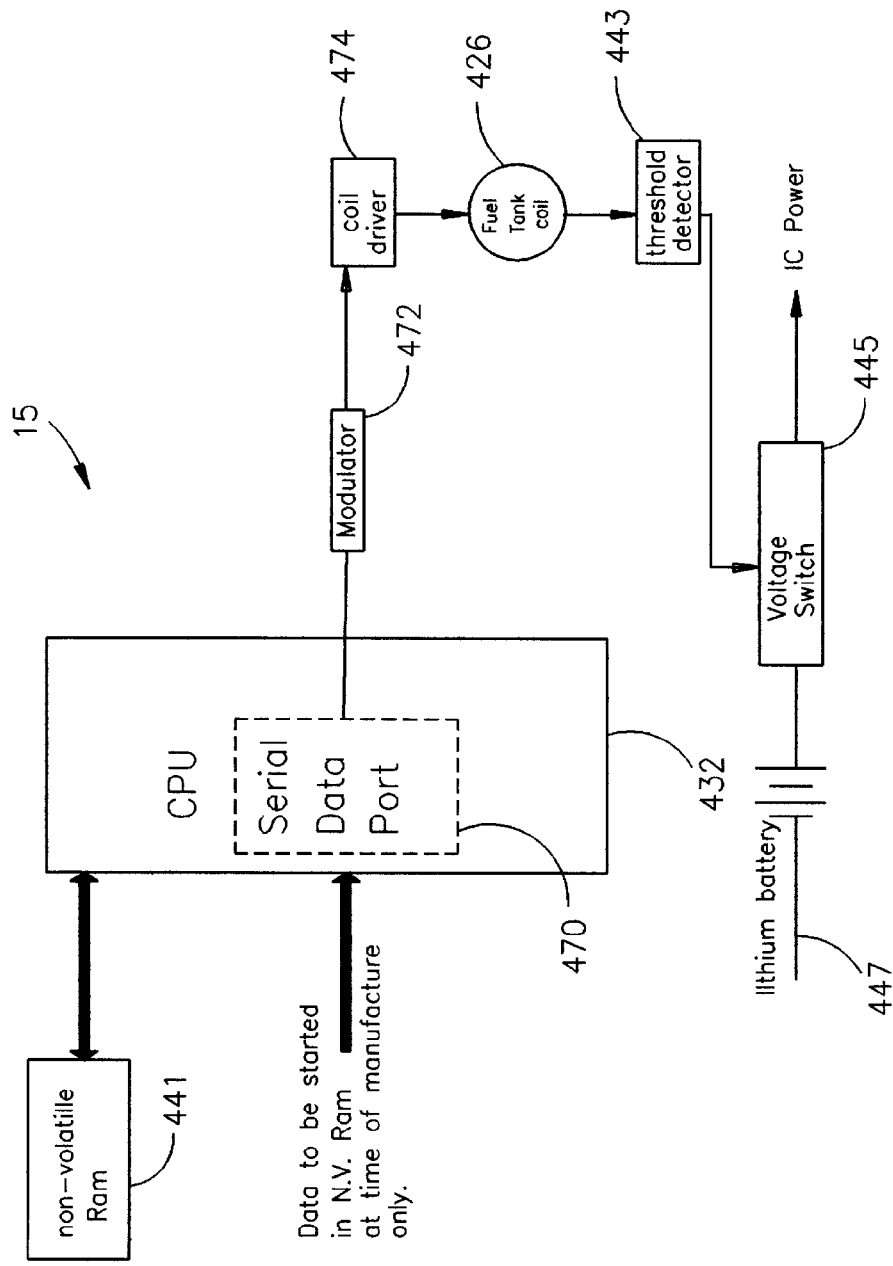
FIG. 11 is a schematic block diagram of a low power threshold detector module with which the saddle pack of FIG. 2 may communicate.

The invention can also be adapted to function with equipment which use petroleum fuel or other fluids but are not necessarily mobile or used on a frequent or continuous basis. In such circumstances, it is desirable to have an identification module which is of low power consumption so that it can be battery operated over a reasonable lifetime. A schematic diagram of a low-power threshold detector identification module 15 is illustrated in FIG. 11 with 400 series numbers identifying elements that correspond to elements of the other identification modules. The central processing unit is a low power CPU 432 with read only program memory and a serial data port 470. It is interconnected with a non-volatile RAM memory device 441 to which is written identification and authorization information at the time of manufacture. In a manner similar to the other identification modules, the low-power identification module can transmit information from the CPU 432 via a fuel tank coil 426 by way of a modulator 472 and coil driver 474. To conserve power, the central processing unit 432 is turned on only when a threshold detector 443 senses that a fuel nozzle has been inserted into the filler neck of the equipment to which the low power identification module 15 has been attached. The threshold detector 443 activates a voltage switch 445 which then supplies power from a lithium battery 447 to the CPU 432.

Figure 12:
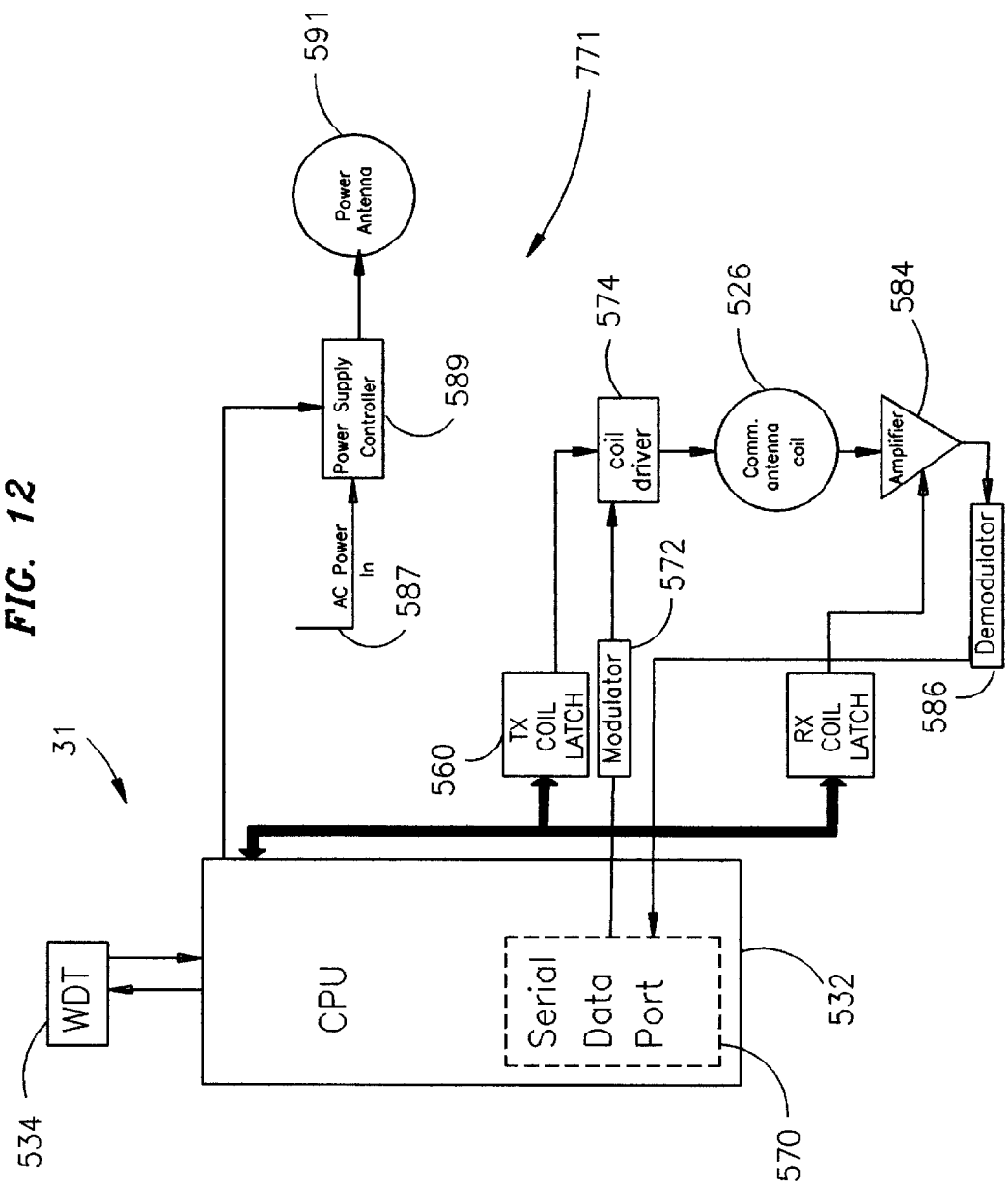
FIG. 12 is a schematic block diagram of a fuel docking station which charges the saddle pack of FIG. 1.

Illustrated schematically in FIG. 12 is a docking station 770, with 500 series numbers identifying elements corresponding to the elements of the other identification modules described previously. The docking station 770 is provided on the fuel dispenser 764 within communicative proximity to the fuel nozzle module 24 when the nozzle 766 is docked in the dispenser 764. The docking station 770 is provided with a fuel docking module 31 which controls the operation of the docking station 770. The fuel docking module 31 has an alternating current power supply 587 which feeds into a power supply controller 589. The fuel docking module 31 also has a power antennae 591 coupled to the power supply controller 589 to supply power inductively to the fuel nozzle module 24 when the nozzle 766 is docked in the docking station 770. In addition to supplying operational power to the fuel nozzle module 24, the docking station 770 can also initialize the fuel nozzle module 24 when the nozzle 766 is docked in the docking station 770. Preferably, a CPU 532 of the docking station 770 is provided with information regarding the pump number with which the docking station 770 is associated, the type of fuel associated with the dispenser 764, and information regarding communication with the terminal site controller 702. Accordingly, if the saddle pack 768 is damaged, a replacement saddle pack may quickly be substituted without the need for a complex reprogramming procedure. The replacement saddle pack is simply attached to the nozzle 766 and moved into communicative proximity with the docking station 770. All of the initialization information needed by the fuel nozzle module 24 is then downloaded from the docking station 770 to the fuel nozzle module 24 leaving the saddle pack 768 ready for the next fueling operation.

Figure 13:
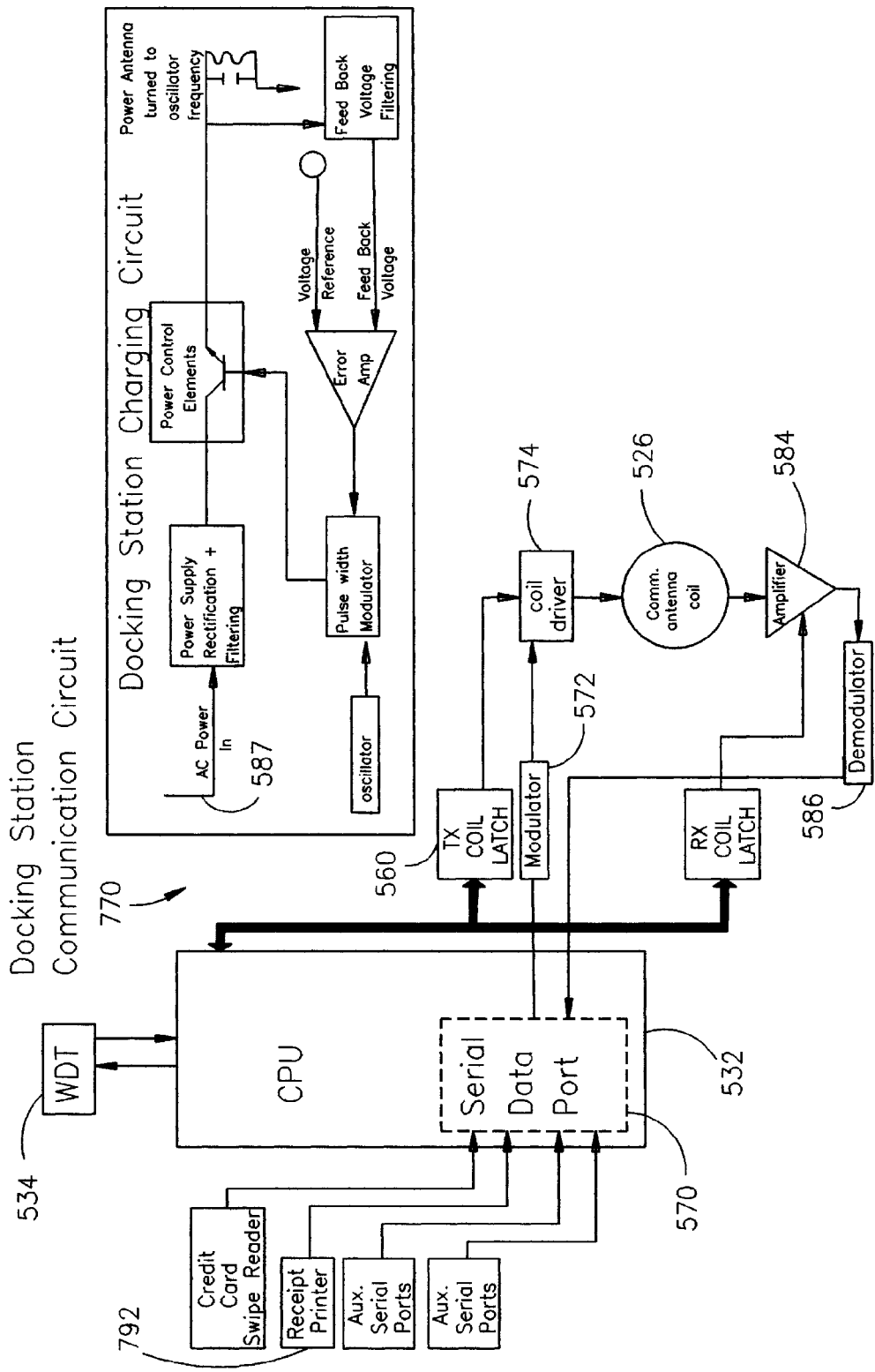
FIG. 13 is a schematic block diagram of an alternative embodiment of the fuel docking module of FIG. 12.

An alternative embodiment of the docking station 770 is illustrated in FIG. 13 which shows a stand-alone charging circuit whereby instead of a regulated direct current output to the power antennae 591, the output would consist of a regulated alternating current signal across a tuned circuit. This tuned circuit would then be inductively coupled to the fuel nozzle module 24 when the nozzle 766 is docked into the fuel dispenser 764 to provide charging power for the fuel nozzle module 24. In another alternative embodiment of the present invention, the docking station 770 may be used simply for a recharge only docking station, the CPU 532 may be replaced. A passive transponder may then be used to identify the docking station 770 to the saddle pack 768. When the saddle pack 768 comes within charging proximity of the docking station 770, the docking station 770 increases power output, thereby charging the saddle pack 768.

Preferably, the docking station 770 is hardwired or coupled via wireless communication to a printer 792 as shown in FIG. 13. The docking station 770 is also either hardwired or coupled via wireless communication to the terminal site controller 702 which allows information regarding a fluid delivery transaction to be transmitted from the terminal site controller 702 through the docking station 770 to the printer to print out a hard copy of the fuel delivery transaction for the operator.

A fuel delivery operation between the truck tractor 12 which carries the vehicle identification module 10 and a fuel pump location having a fuel nozzle module 24 begins when the truck tractor 12 pulls into a fuel delivery location. The terminal site controller 702 polls the vehicle identification module 10 to receive engine diagnostics and transponder codes via RF communication. The operator removes the nozzle 766 from the docking station 770 of the fuel dispenser 764 and inputs a operator code into the keyboard 744 of the saddle pack 768. Alternatively, the operator code may be placed on a magnetic strip card (not shown) and inputted via the magnetic card reader 786. The operator code identifies the operator and authorizes fuel delivery. Once the low power radio data link 667 has relayed the operator code information to the terminal site controller 702 and the terminal site controller 702 has confirmed the operator as an authorized operator, the terminal site controller 702 relays this information to the saddle pack 768 which displays the information on the liquid crystal display 742, informing an operator that the filling procedure may begin. Alternatively, the operator code may be stored on the passive transponder 772 and automatically confirmed when the fuel nozzle 766 is placed into the filler neck of the fuel tank as described below.

To begin fuel delivery, the operator will remove the fuel cap from the fuel tank of the truck tractor 12. The operator will then insert the fuel nozzle 766 of the fuel dispenser 764 into the filler neck of the fuel tank. When the fuel nozzle coil 28 is in communicating proximity with the passive transponder 772, the passive transponder 772 will receive an inquire signal from the fuel nozzle coil 28. Upon receipt of the inquire signal, the passive transponder 772 will transmit its unique identification code to the fuel nozzle module 24. If the unique identification code is recognized by the terminal site controller 702, the delivery of fuel will begin. Upon receipt of the unique identification code, the time and date of the same will be recorded at the terminal site controller 702, and the previously recorded diagnostic information, received from the vehicle identification module 10, including the truck tractor 12 engine hours and odometer reading, and the license number and state code of any trailers 14 and/or 16, is transmitted to the saddle pack 768 for display to the operator if requested by the operator.

During the fuel delivery operation, the fuel nozzle module 24 continues to require a unique identification code from the passive transponder 772. If no unique identification code is received, the fuel delivery will be discontinued. In the preferred embodiment, an inquire signal is transmitted at every one second interval. Accordingly, if the fuel nozzle 766 is withdrawn or becomes inadvertently removed from the filler neck of an authorized vehicle, the delivery of fuel will be promptly interrupted.

During fueling, the turbine flow sensor 774 positioned within the nozzle 766 sends a signal to the fuel nozzle module 24 which corresponds to a preselected volume of delivered fuel, e.g., ten pulses for every one-tenth of a gallon. These pulses are translated into a volume of fluid delivered and displayed on the liquid crystal display 742. In this way, the operator can keep track of the volume of fuel delivered to an authorized vehicle by monitoring the liquid crystal display 742. From the saddle pack 768 the volume information is transmitted via radio link to the terminal site controller 702. This information may also be transmitted from the terminal site controller 702 to the vehicle identification module 10 where it may be stored for later retrieval by the operator or vehicle owner.

The terminal site controller 702 can also request and receive via radio frequency communication complete diagnostic engine data from the SAE J1708 Engine Diagnostic Bus 715 via the ECM 714 of the truck tractor 12 if the truck tractor 12 is equipped with a radio frequency modem. The keyboard 744 can be used if fuel is to be delivered to a truck tractor that is not equipped with a passive transponder. In this mode, an override unique identification code would be inputted into the keyboard 744 by the operator to permit a fuel delivery operation to proceed in an override condition.

Information from either the saddle pack 768 or the vehicle identification module 10 may be transmitted to the terminal site controller 702 via low power radio frequency. From the terminal site controller 702, the information may be transmitted to a remote location such as a main frame company computer via telephone lines in the usual method or via cellular telephone intercommunication. Any or all of the diagnostic information received from the vehicle identification module 10 may be forwarded from the terminal site controller 702 to the saddle pack 768 for display to the operator. A hard copy of the fuel delivery transaction is printed by a printer connected either to the personal computer of the terminal site controller 702 or to the docking station 770. The hard copy may be stored by the owner of the service station, with a copy going to the truck tractor operator and to the owner of the truck tractor 12. Additionally, a printer may be hardwired or connected via wireless communication to the docking station 770 to provide a hard copy of the fuel delivery transaction directly to the operator. If the terminal site controller 702 is connected so as to transmit information to a remote computer, the invention can be used to provide automatic data capture to allow for electronic funds transfer or ACH payment of fuel purchases and to permit generation of accounts receivable, inventory, fleet management, stocks depletion, and excise tax accounting reports of interest to the owner of the truck tractor 12 and of the service station. Preferably, this information is also provided to operator via the display 742 during a fueling operation. In lieu of this information being provided, diagnostic or promotional information may be shown on the display 742.

Information and data may be exchanged between the vehicle identification module 10 and the trailer identification module 18 either by way of a hard-wired RS232 or RS485 communication link or by intercommunicating coils similar to the fuel tank and fuel nozzle coils described above or using wireless radio communication. The advantage of the intercommunicating coils is that no independent, hard-wired connection is required, so that the connection is not subject to degradation under the severe environmental and use conditions experienced by over-the-road trucks. A truck tractor coil is mounted on the rear of the truck tractor so that it will be in communicating proximity to a trailer coil that will be mounted on the front end portion of the trailer 14. Alternatively, the tractor coil could be mounted under the fifth-wheel hub and above the frame of the tractor; the trailer coil would then be mounted on the trailer floor so that it will be above the tractor coil when the trailer is connected to the fifth wheel. Or, the tractor coil is embedded in the casting of the fifth-wheel hub and the trailer coil in the fifth-wheel plate of the trailer. Information collected by the trailer identification module 18 can thus be communicated to the vehicle identification module 10 and, conversely, odometer and time and date information can be transmitted from the vehicle identification module 10 to the trailer identification module 18. A similar set of coils are provided between the first trailer 14 and the second trailer 16 so that intercommunication between the vehicle identification module 10 and the second trailer identification module 20 can occur.

The fuel nozzle module 24 is also provided with an identification code which is preferably software set on either the EEPROM 647 or the CPU 632. Because the identification code is set by software, it may be reset remotely from the terminal site controller 702 or directly from the keyboard 744. This software setting of the identification code allows the identification code to be quickly changed without having to open up the saddle pack 768.

At hook up of the truck tractor 12 and the trailer 14, a unique identification code is transmitted from the truck tractor 12 to the trailer 14 through the coils 80 and 126. If the trailer identification module 18 recognizes the unique identification code, it will respond with its resident identification code and totalized mileage. This information is stored at the vehicle identification module 10. If manifest information has been stored at the trailer identification module 18, it will also be transmitted for storage at the vehicle identification module upon hookup.

If the trailer 18 is a refrigerated trailer, or "reefer" the vehicle identification module will request a systems check of the conditions, for example temperature and humidity, inside the refrigerated trailer. Such information is available on the trailer identification module from its sensors 115a-115c and 117a-117c. Additionally, whether the doors are open on the refrigerated trailer could be monitored as well as fuel level in the engine which powers the refrigeration unit of the refrigerated trailer.

The trailer identification module 18 is connected to the electrical system of the truck tractor 12. When the trailer 14 is unhooked from the truck tractor 12, the trailer identification module 14 senses the loss of power and built in capacitors provide the power to write data to nonvolatile memory of the trailer identification module 18 for storage. In this way, total accumulated mileage of the trailer 14 is always available from the trailer identification module 18 even though it may not be always powered. If the trailer 14 is a refrigerated trailer, power will be available from the refrigeration unit.

An information and power input module is located at the rear of the trailer 14 and communicates with the trailer identification module 18. Information regarding the manifest or cargo to be carried by the trailer 14 can be input via this communication linkage which is connected to the RS485 driver 152 of the trailer identification module 18.

A theft prevention function is built in to the trailer identification module 18. If, at the time of hookup, the trailer identification module 18 receives an appropriate company unique identification code, the motor driven valve 123 is opened and the air line is opened to the air brakes of the trailer 14. When the truck tractor 12 is unhooked from the trailer 14, the operator will hold a switch down and manually drive the solenoid to the closed position to put the trailer in a "safe" condition.

The automotive identification module 11 (FIG. 9) functions very similarly to the vehicle identification module 10, and as explained above, has similar components. A 2K memory key 22 is inserted by an operator into an appropriate receptacle of the automotive identification module 11. The automotive identification module records the operator's identification number and unique identification code and records on the memory key 22 the time and date every time that the automobile engine is started and stopped along with a chart of accounts and a business or personal mileage designation. Additionally, the vehicle identification code is written to the memory key 22 upon its insertion by the operator.

A 64K memory key 259 is used with the automotive identification module 11 to act as a portable random access memory device for data and information storage and downloading of such information which is written to the key by the automotive identification module 11. Inputs from the odometer 240 and ignition transponders 238 are written to the memory key 259 when the vehicle is started and stopped so as to provide a corresponding log of miles and engine hours along with the clock time of starting and stopping of the automobile. An optional keyboard 225 can be used to provide a means for inputting a chart of accounts and for selecting a credit card identification code which is stored in the memory of the automobile identification module 11 to provide authorization for payment of fuel via the stored credit card information. This credit card information can be accessed only through the inductive link between the coils of the fuel nozzle and the fuel filler neck. While the automobile identification module 11 is primarily powered by power from the battery of the automobile, a lithium battery 244 is provided for backup power for the clock/calendar module 246.

An additional application of the invention is the mobile construction equipment identification module 13 (FIG. 10). As with the automobile identification module 11, a 2K bit memory key 322 or a 64K bit memory key (not shown) may be used to input the company unique identification code for fueling, the operator identification code and other such information for downloading to the mobile construction equipment identification module 13. All other features remain substantially unchanged. An additional capacity is provided by the four channel multiplexer and analog to digital converter 331 which permits four transponders to be connected to the central processing unit 332 for monitoring of operating conditions of the construction equipment on which the identification module 13 is mounted. For example, engine oil level could be monitored and connected to an alarm, and so on.

The module 13 has particular applicability in the airline industry wherein the fuel filler necks of the airplane tanks are equipped with passive transponders 326 and fuel is delivered from a mobile truck equipped with a fuel nozzle module 24 as described above. The fuel nozzle module 24 would communicate and interact with a module (not shown) located within the truck to ensure that only the proper type of fuel was delivered, to automatically record on the airplane and at the terminal site controller 702 the type of fuel delivered, the date and time, quantity, operator identification, and other useful information.

The invention also contemplates a low power threshold detector module 15 (FIG. 11) for use on equipment which does not include a battery or other power means. The low power threshold detector module 15 has recorded in nonvolatile RAM 441 a company, vehicle, and fuel type code. This code is recognized by fuel pumps that are owned by the owner of the equipment on which the low power threshold detector module 15 is mounted. The low power identification module 15 remains inert until a threshold detector 443 is breached after which power is provided from a lithium battery 447 through a voltage switch 445 to a central processing unit 432.

Figure 18:
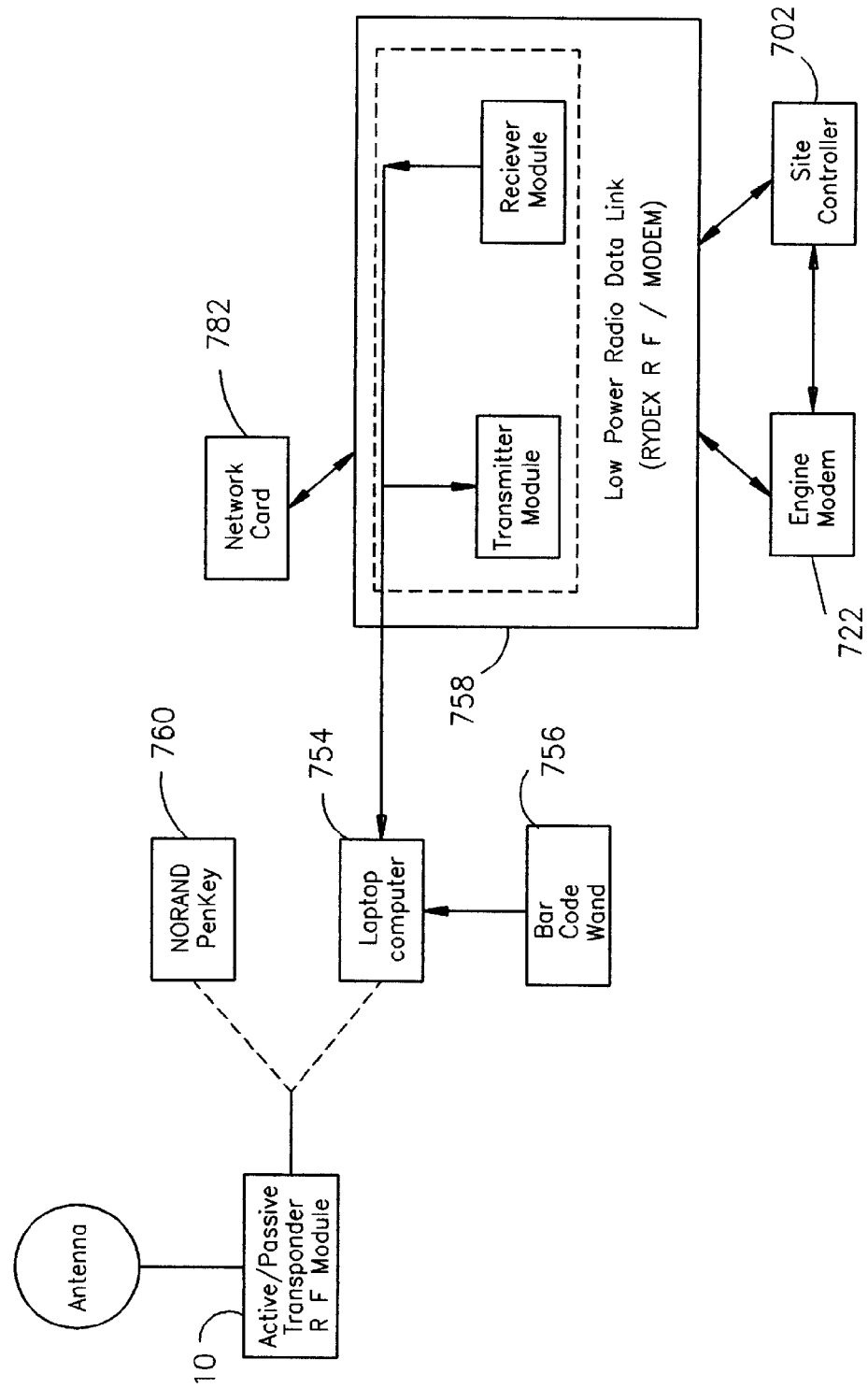
FIG. 18 is a schematic block diagram of alternative readers for communicating with the vehicle identification module of the vehicle shown in FIG. 1.

As shown in FIG. 18, the vehicle identification module 10 may be read by a nonfueling device, such as a laptop computer 754 coupled to a bar code wand 756 and a low power radio data link 758 similar to those described above. Alternatively, a pen key 760, such as that supplied by Norand®, which incorporates a radio data link and a bar code reader, may be used for data collection and processing for information received from the vehicle identification module 10 and for communication back and forth with the terminal site controller 702. This alternative embodiment allows service personnel to quickly diagnose problems associated with the truck tractor 12 and to receive information from the terminal site controller 702 regarding periodic maintenance such as oil changes and tune-ups. The low power radio data link 758 may also be coupled to a network card 782 which allows the laptop computer 754 to communicate directly with a computer network.

Figure 19:
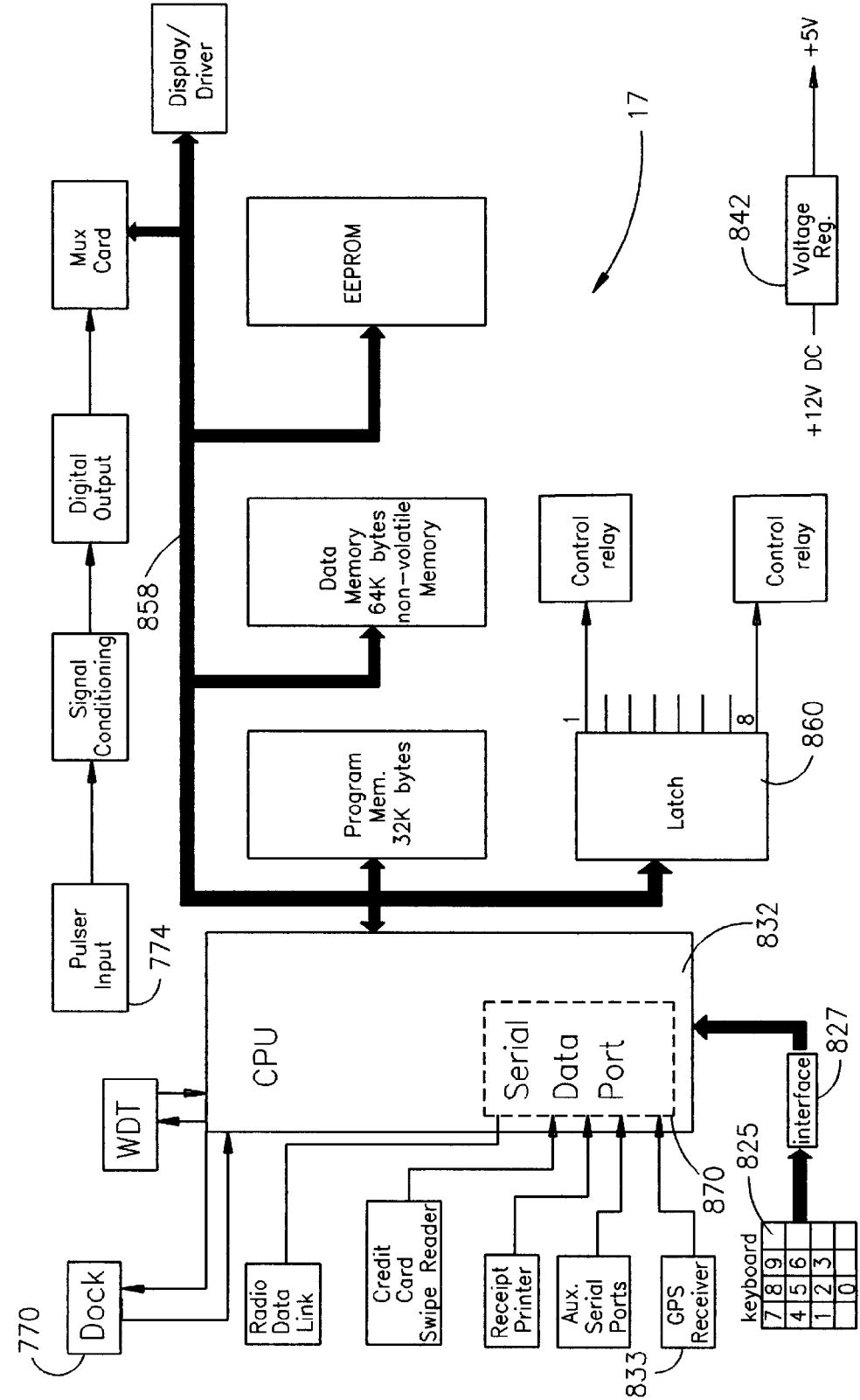
FIG. 19 is a schematic block diagram of a fuel pump truck module of the apparatus of the present invention.

As an alternative to the preferred stationary fuel pump location, fuel may delivered to vehicles by a mobile pump truck (not shown). Included in the invention is a pump truck terminal site controller 17 which is illustrated schematically in FIG. 19, with 800 series numbers identifying elements corresponding to similar elements of the other identification modules described previously. The pump truck site controller 17 is preferably located in the cab of the mobile truck.

The pump truck terminal site controller 17 differs in that the CPU 832 is coupled to a latch 860 which, in turn, is coupled to several control relays which are positioned between a pump (not shown) and several hoses 762. As in the aforementioned embodiments of the present invention, each hose 762 is secured to a nozzle 766 having a saddle pack 768. As each control relay is opened, fuel is allowed to flow from the pump through the associated hose 762.

To begin fueling from the pump truck, the nozzle 766 which dispenses the desired fluid is removed from the associated docking station 770 and placed within a filler neck of a fluid container (not shown). Upon insertion, the saddle pack 768 sends a power signal to the passive transponder 772 associated with the fluid container to obtain an identification code. Upon receipt of the identification code, the saddle pack 768 transmits this information to the pump truck site controller 17 which cross checks the code to assure fluid is being delivered to an authorized vehicle and to check the proper fluid type which is to be delivered. The pump truck terminal site controller 17 signals the latch 860 to energize the correct control relay to allow the appropriate fluid to be dispensed. Upon actuation of the proper control relay, the correct fluid travels to the nozzle 766 where the operator may dispense the fluid into the fluid container. If the operator has inadvertently placed the wrong nozzle into the fluid container, the pump truck site controller 17 will not actuate the associated control relay, thereby preventing an incorrect fluid from being dispensed into the fluid container. The pump truck site controller 17 is preferably provided with an override mechanism (not shown) to permit the delivery of fluid to authorized vehicles which do not have an appropriate passive transponder or other identification module. The override mechanism may be triggered by the operator by inputting a code into the saddle pack 768 which is communicated to the pump truck site controller 17. The pump truck site controller 17 is also preferably provided with a global positioning satellite receiver 833 coupled to the serial data port 870 which allows the recordation of the delivery site for a particular fluid delivery transaction. The global positioning satellite receiver 833 may also be used in association with the stationary terminal site controller 702, but there is a particular advantage in the mobile situation given that subsequent mobile fueling operations rarely take place in the same geographic location. The pump truck site controller 17 is also coupled to the turbine flow sensor 774 or other fluid flow monitor positioned within the stream of fluid delivery. The turbine flow sensor 774 produces a signal which passes through a conditioner to obtain a digital output which is forwarded to a multiplex card connected to the bus 858 of the pump truck terminal site controller 17.

The preferred embodiment described herein is a liquid petroleum fuel delivery system. The invention can, of course, be used with a delivery system for any fluid, such as water, compressed gases, pharmaceuticals via intravenous injection, ammonia, solvents, engine oil, transmission fluid, paint, beverages, herbicides and pesticides, and so on.

What is claimed is:

1. A method for controlling fluid delivery, the method comprising the steps of:
   providing a site controller for a fluid delivery location, the site controller having a first envelope of communication encompassing the fluid delivery location wherein wireless signals may be acquired;
   providing a fluid delivery device, the fluid delivery device having a second envelope of communication wherein wireless signals may be acquired within a short distance from the fluid delivery device;
   upon entry of a fluid container device within the first envelope of communication, wirelessly receiving at the site controller at least one of:
      a container identification code from the container, the container associated with the fluid container device;
      a first identification code from the fluid container device;
      an operator identification code from an operator identification device; and
      information regarding at least one of the container other than the container identification code, the fluid container device other than the first identification code and the operator other than the operator identification code;
   upon arrival of the fluid container device within the second envelope of communication, wirelessly receiving at the fluid delivery device before a fluid delivery a second identification code from the fluid container device, the fluid container device not physically associated with the fluid delivery device, and the site controller not physically associated with the fluid delivery device and the fluid container device;
   transmitting wirelessly, by the fluid delivery device, to the site controller the second identification code;
   upon comparing, by the site controller, the first identification code and the second identification code and determining that the appropriate fluid container should be delivered fluid, transmitting wirelessly from the site controller an activation instruction to the fluid delivery device, the activation instruction enabling the fluid delivery device to begin dispensing fluid;
   wirelessly receiving at the site controller certain information specific to the fluid delivery from the fluid delivery device; and
   transmitting wirelessly from the site controller a de-activation instruction to the fluid delivery device, the de-activation instruction enabling the fluid delivery device to stop dispensing fluid.

2. The method as defined in claim 1, further comprising the step of displaying information regarding the fluid delivery on a display device coupled to the fluid delivery device.

3. A method as defined in claim 1, further comprising the steps of acquiring at least one of the container identification code, first identification code and operator identification through at least one of: (i) manual input at the fluid delivery device and (ii) a scanning device.

4. A method as defined in claim 2, further comprising the step of transmitting advertising or promotional information to the display device.

5. A method as defined in claim 1, further comprising the step of generating a payment transaction from said certain information specific to said fluid delivery.

6. A method as defined in claim 1, wherein the fluid comprises liquid fuel and the fluid delivery device operatively controls a fuel dispenser and wherein the fluid container device is associated with a fuel tank of a vehicle.

7. A method as defined in claim 6, wherein information regarding the fuel tank of the vehicle is acquired from the fluid container device.

8. A method for controlling a fluid delivery, the method comprising the steps of:
   providing a site controller for a fluid delivery location, the site controller having a first envelope of communication encompassing the fluid delivery location wherein wireless signals may be acquired;
   providing a fluid delivery device, the fluid delivery device having a second envelope of communication wherein wireless signals may be acquired within a short distance from the fluid delivery device;
   upon arrival of the fluid container device within the second envelope of communication,
      (a) wirelessly receiving at the fluid delivery device before a fluid delivery a first identification code from the fluid container device, the fluid container device not physically associated with the fluid delivery device and transmitting wirelessly, by the fluid delivery device, to the site controller the first identification code; and
      (b) wirelessly receiving, by the site controller, at least one of:
         a second identification code from the fluid container device;
         an operator identification code from an operator identification device; and
         information regarding at least one of the fluid container other than the identification code from the fluid container device, the fluid container device other than the identification code from the fluid container device, and the operator other than the operator identification code from the operator identification device;
   determining, by the site controller, that the fluid container device should be delivered fluid based upon a comparison of the first identification code and at least one of: the second identification code, the operator identification code, and the information regarding at least one of the fluid container other than the identification code from the fluid container device, the fluid container device other than the identification code from the fluid container device, and the operator other than the operator identification code from the operator identification device;

wirelessly receiving at the fluid delivery device an activation instruction, the activation instruction enabling fluid to be dispensed by the fluid delivery device;

transmitting wirelessly during the fluid delivery by the fluid delivery device to the site controller information specific to the fluid delivery; and wirelessly receiving at the fluid delivery device from the site controller a de-activation instruction, the de-activation instruction causing the fluid delivery device to prohibit further dispensing of fluid.

9. A method as defined in claim 8, further comprising the step of displaying on a display device operably coupled to the fluid delivery device information regarding the fluid delivery.

10. A method as defined in claim 8, further comprising the step of transmitting the information specific to the fluid delivery to a remote location by the site controller.

11. A method as defined in claim 10, wherein said remote location has financial account information regarding an at least one of an operator of the fluid container and the fluid container, and further comprising the step of generating a debit or credit transaction using the information specific to the fluid delivery to pay for the fluid delivered.

12. A method as defined in claim 8, further comprising the step of communicating information regarding the geographic location of the fluid container device from a GPS transmitter associated with the fluid delivery device and including the information regarding the geographic location in the information regarding the fluid delivery.

13. A method as defined in claim 8, further comprising the step of communicating information specific to said fluid delivery to a third-party information storage and retrieval device which includes information regarding at least one of the fluid container device, the fluid container, and a container associated with the fluid container device and transmitting said information regarding the container to said third-party information storage and retrieval device.

14. A method as defined in claim 13, wherein the fluid container is a vehicle being fueled and said information specific to the fluid delivery includes engine diagnostics, fault codes, maintenance schedule information, recall notices, or stolen status of the vehicle.

15. A method as defined in claim 8, wherein the fluid container device includes an information storage and retrieval device which contains information regarding the status of a container associated with the fluid container device and further comprising the step of combining the information regarding the status of a container associated with the fluid container device with the information specific to the fluid delivery transmitted to the site controller.

16. A method as defined in claim 15, wherein the status information includes diagnostic information obtained from at least one of the fluid container device and a wireless communication device coupled to the fluid container.

17. A method for remotely controlling a plurality of fluid deliveries, the method comprising the steps of:

providing a site controller for a fluid delivery location, the site controller having an envelope of communication encompassing the fluid delivery location wherein wireless signals may be acquired;

providing a plurality of fluid container devices wherein at least one of the fluid container devices moves in and out of the envelope of communication, and wherein the site controller is not physically associated with the plurality of fluid container devices and controls any fluid delivery to fluid containers associated with the fluid container devices;

upon entry of at least one of the fluid container devices within the envelope of communication, wirelessly receiving at the site controller from the at least one of the fluid container devices at least one of: (i) a first identification code associated with at least one fluid container device; and (ii) a first status information associated with at least one fluid container device;

upon arrival of the at least one of the fluid container devices to the point of fluid delivery, the point of fluid delivery including at least one fluid delivery device, wirelessly receiving at the site controller before at least one fluid delivery, at least one of: (i) a second identification code associated with at least one fluid container device; and (ii) a second status information associated with at least one fluid container device from the at least one fluid delivery device, the site controller not physically associated with the fluid delivery devices, the respective fluid delivery devices associated with a respective fluid container device; and upon comparing the at least one of: (i) a first identification code associated with at least one fluid container device; and (ii) a first status information associated with at least one fluid container device information, and the at least one of: (i) a second identification code associated with at least one fluid container device; and (ii) a second status information associated with at least one fluid container device by the site controller, and determining that fluid should be delivered, wirelessly transmitting from the site controller an activation instruction to the respective fluid delivery device, the activation instruction enabling the fluid delivery device to begin dispensing fluid;

wirelessly receiving at the site controller during the fluid deliveries certain information regarding the fluid deliveries, the information including data to control the fluid deliveries; and wirelessly transmitting by the site controller a de-activation instruction to at least one of the fluid delivery devices, the de-activation instruction enabling at least one of the fluid delivery devices to stop dispensing fluid to the fluid container associated with the respective fluid container device.

18. A method for controlling a fluid delivery, the method comprising the steps of:

providing a site controller for a fluid delivery location, the site controller having an envelope of communication encompassing the fluid delivery location wherein wireless signals may be acquired;

providing a fluid delivery device, the fluid delivery device configured to wirelessly communicate with the site controller within the envelope of communication and the fluid delivery device is not physically associated with the site controller;

wirelessly receiving, from the fluid delivery device, at the site controller information including an identification code of a fluid container regarding an impending fluid delivery, wherein the site controller controls the fluid delivery device that becomes associated with the impending fluid delivery;

wirelessly receiving, by the site controller, at least one of: the identification code from the fluid container that becomes associated with the impending fluid delivery;

an operator identification code from an operator identification device; and information regarding at least one of: the fluid container other than the identification code from the fluid container, and the operator other than the operator identification code from the operator identification device;

upon correlating, by the site controller, the identification code from the fluid delivery device and at least one of: the identification code from the fluid container, the operator identification code, and the information regarding at least one of: the fluid container other than the identification code from the fluid container, and the operator other than the operator identification code from the operator identification device, determining, by the site controller, that the fluid should be delivered and wirelessly transmitting from the site controller to the fluid delivery device an instruction, the instruction configured to control the fluid delivery device during the fluid delivery;

wirelessly receiving during the fluid delivery at the site controller from the fluid delivery device, at least one of additional information (i) specific to the fluid container; (ii) specific to the fluid delivery; and (iii) specific to the fluid delivery device;

wirelessly transmitting by the site controller a de-activation instruction to the fluid delivery device, the de-activation instruction enabling the fluid delivery device to stop dispensing fluid.

19. A method as defined in claim 17, wherein the fluid delivery devices provide a fluid to at least one human subject and wherein the fluid container devices are associated with at least one human subject.

20. A method as defined in claim 1, wherein the certain information specific to the fluid delivery includes information regarding a fluid container associated with the fluid container device.

21. A method as defined in claim 20, wherein said information regarding the fluid container comprises diagnostic information regarding the fluid container.

22. A method as defined in claim 18, wherein the fluid delivery device dispenses fluids to a human subject.

23. A method as defined in claim 22, wherein the certain information specific to the fluid delivery includes information collected by the fluid delivery device associated with the human subject regarding the human subject.

24. A method as defined in claim 21, wherein said fluid container device is associated with a human subject.

25. A method as defined in claim 8, wherein said fluid container device wirelessly communicates information regarding a fluid container associated with the fluid container device to the site controller.

26. A method as defined in claim 25, further comprising the step of communicating information regarding the fluid container from the site controller to the fluid delivery device.

27. A method as defined in claim 18, further comprising the step of communicating information regarding the fluid delivery between the fluid container device and the fluid delivery device.

28. A method as defined in claim 18, further comprising the step of communicating information regarding the apparatus containing the fluid container to the site controller from the fluid delivery device.

29. A method as defined in claim 28, further comprising the step of communicating information regarding the apparatus containing the fluid container from the site controller to the fluid delivery device that becomes associated with the fluid container device for the fluid delivery.

30. A method as defined in claim 15, wherein said information regarding the status of the fluid container is transmitted from the site controller to the fluid delivery device.

* * * * *